Figure 1:
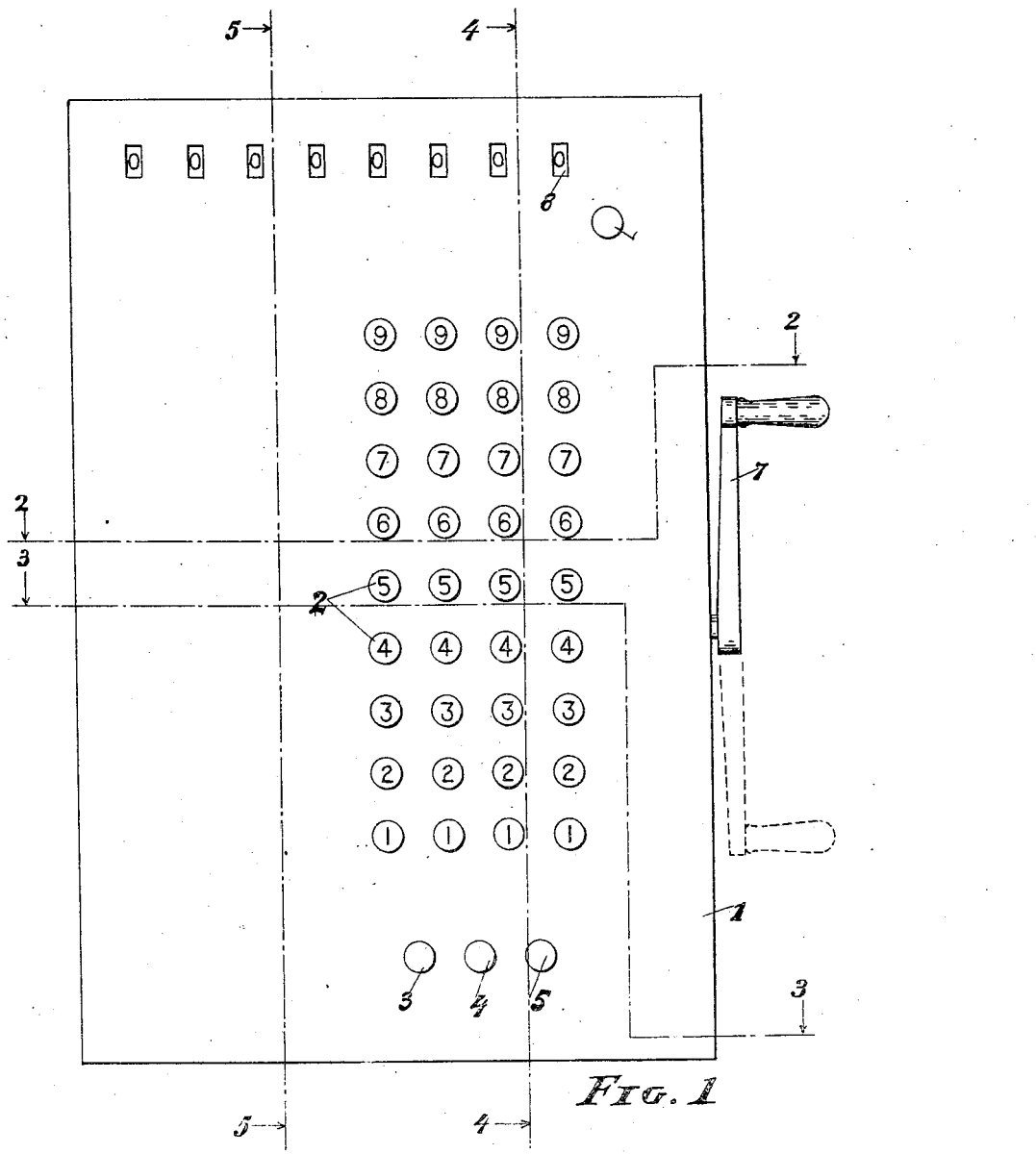

F. L. MARTINDALE.
CALCULATING MACHINE.
APPLICATION FILED AUG. 30, 1912.

1,157,320.

Patented Oct. 19, 1915.
3 SHEETS—SHEET 1.

WITNESSES:

INVENTOR
Frank L Martindale
BY
Geo B Willcox ATTORNEY

F. L. MARTINDALE.
CALCULATING MACHINE.
APPLICATION FILED AUG. 30, 1912.

1,157,320.

Patented Oct. 19, 1915.
31 SHEETS—SHEET 2.

WITNESSES:
Jno. V. Carpenter
Christine A. Braidel.

INVENTOR
Frank L. Martindale
BY
Geo. B. Willcox ATTORNEY

F. L. MARTINDALE.
CALCULATING MACHINE.
APPLICATION FILED AUG. 30, 1912.
1,157,320.
Patented Oct. 19, 1915.
31 SHEETS—SHEET 3.
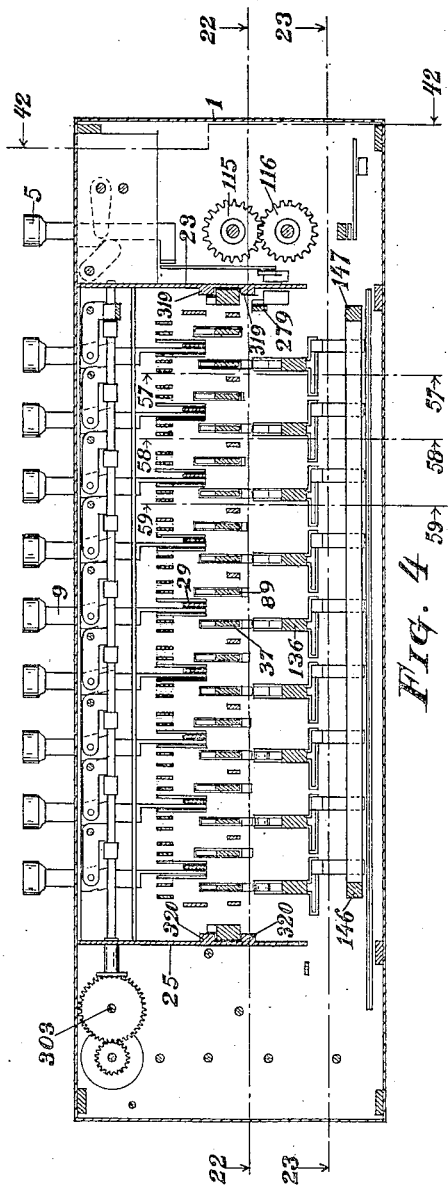
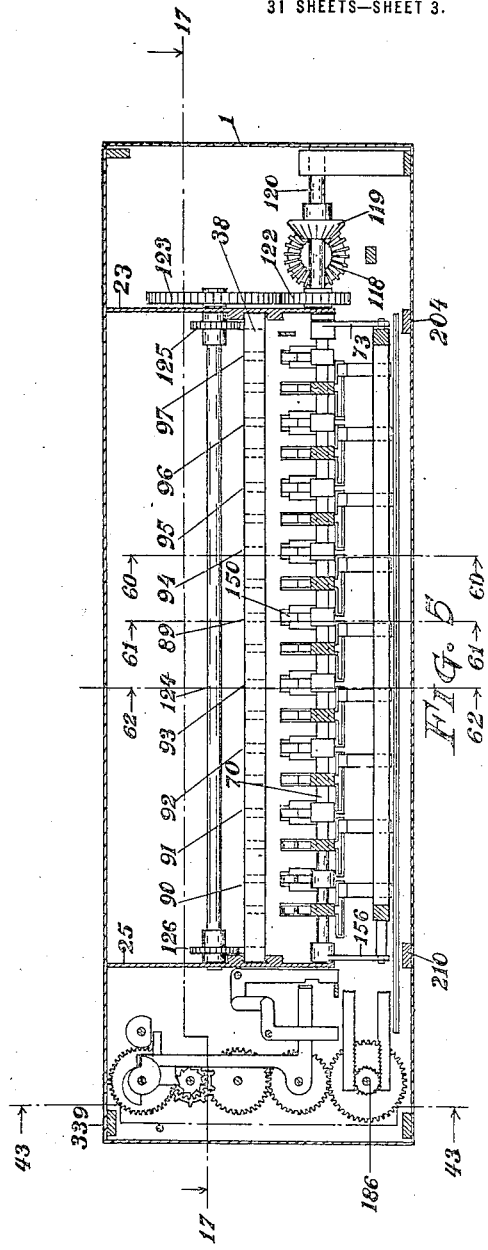
WITNESSES:
INVENTOR
Frank L. Martindale
BY
Geo. B. Willcox ATTORNEY

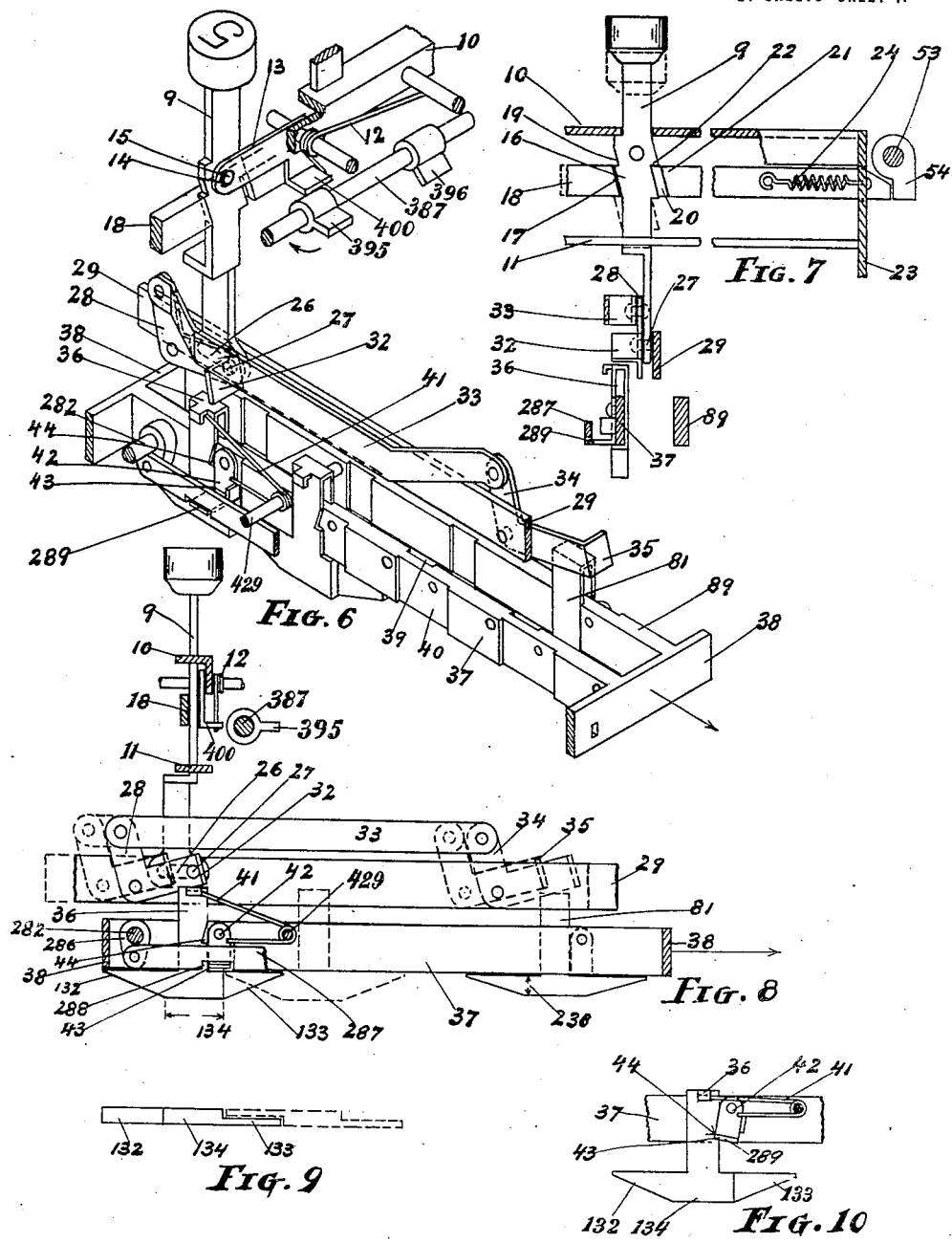

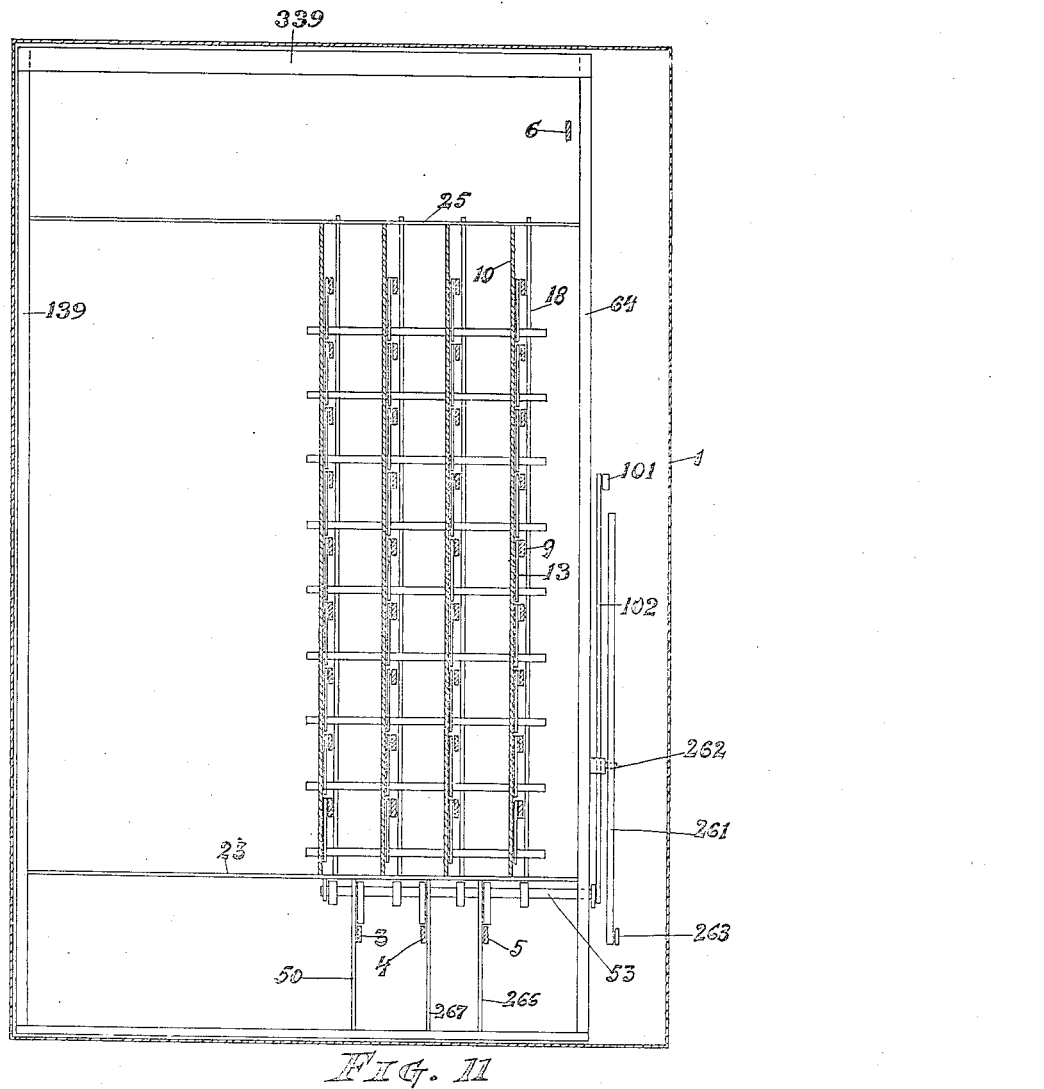

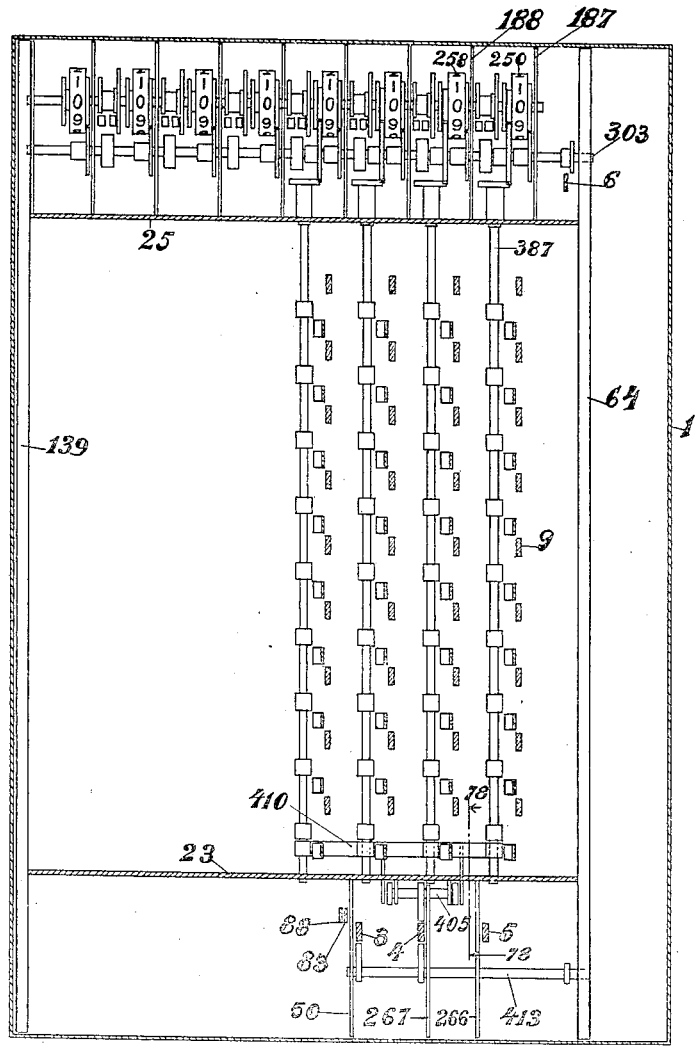

F. L. MARTINDALE.
CALCULATING MACHINE.
APPLICATION FILED AUG. 30, 1912.
1,157,320.
Patented Oct. 19, 1915.
31 SHEETS—SHEET 7.
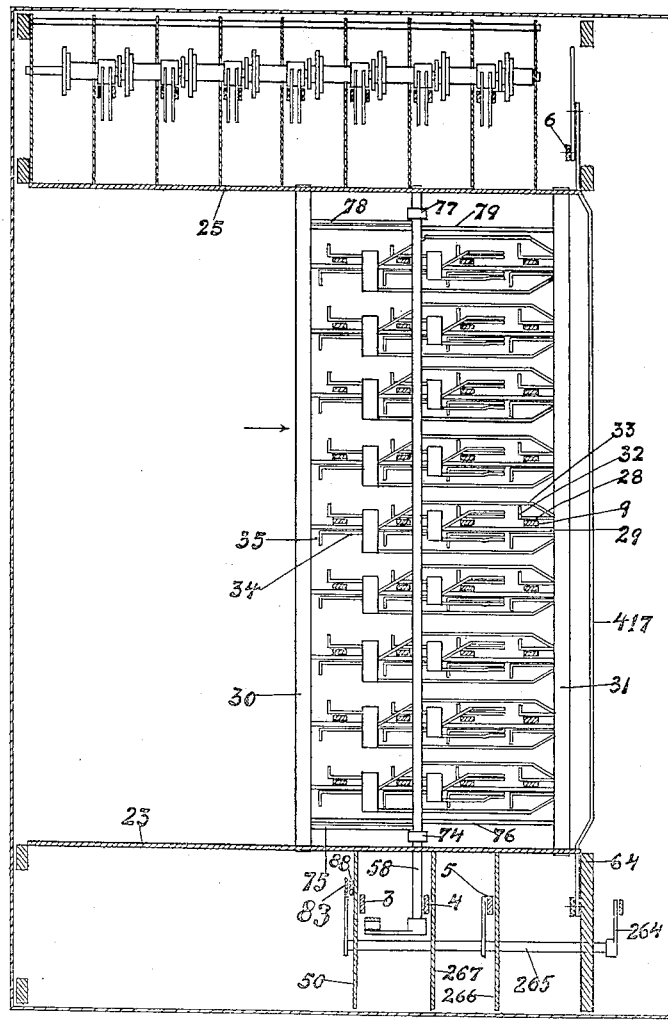
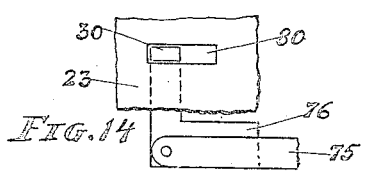
WITNESSES:
INVENTOR
Frank L. Martindale
BY
ATTORNEY

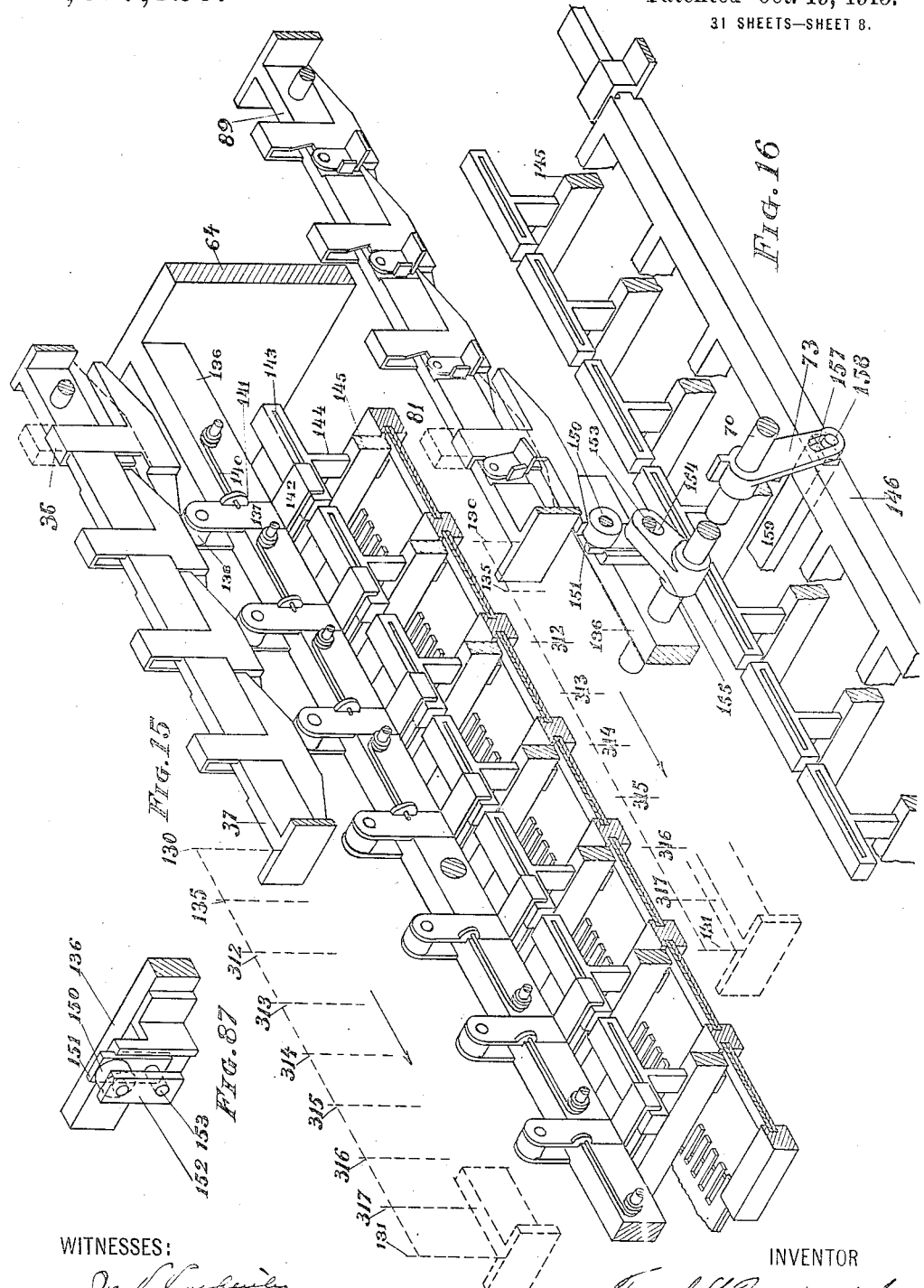

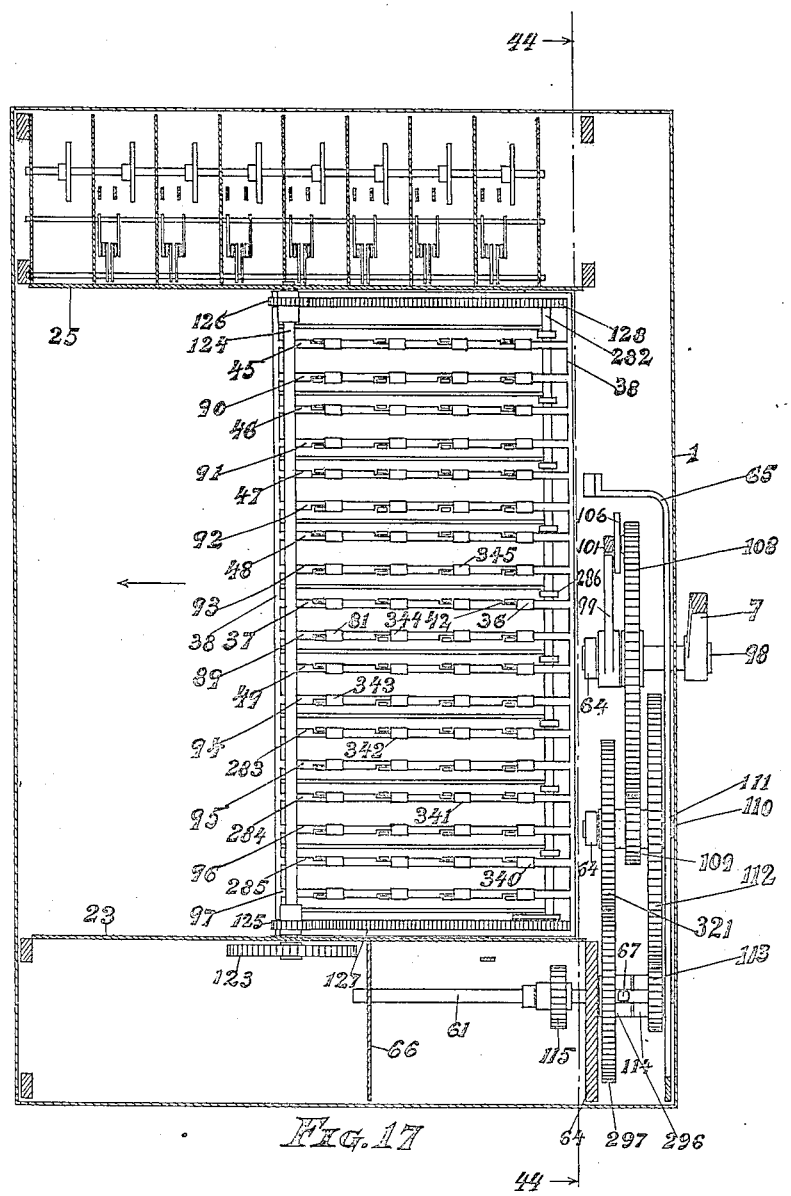

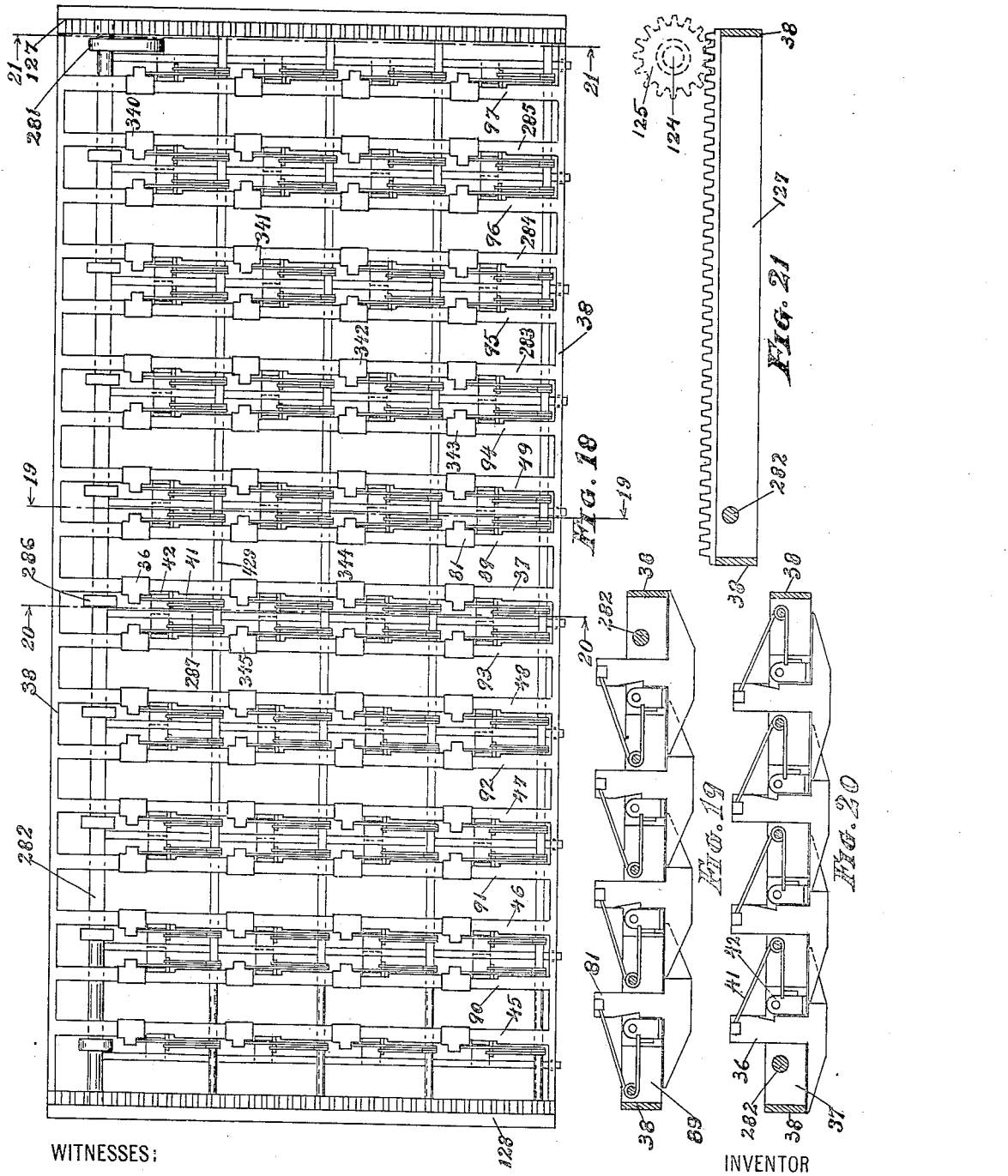

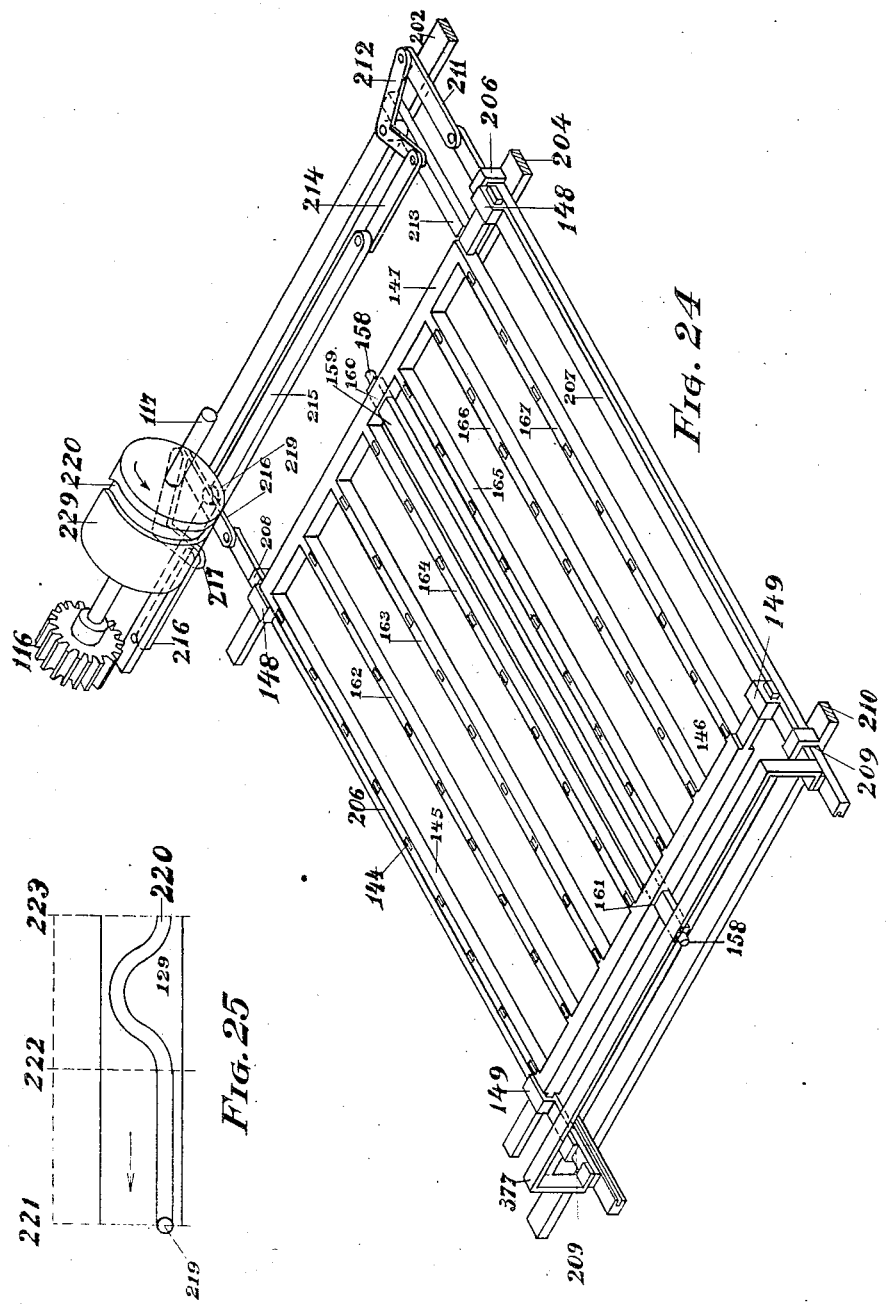

F. L. MARTINDALE.
CALCULATING MACHINE.
APPLICATION FILED AUG. 30, 1912.

1,157,320.

Patented Oct. 19, 1915.
31 SHEETS—SHEET 15.

F. L. MARTINDALE.
CALCULATING MACHINE.
APPLICATION FILED AUG. 30, 1912.
1,157,320.
Patented Oct. 19, 1915.
31 SHEETS—SHEET 16.
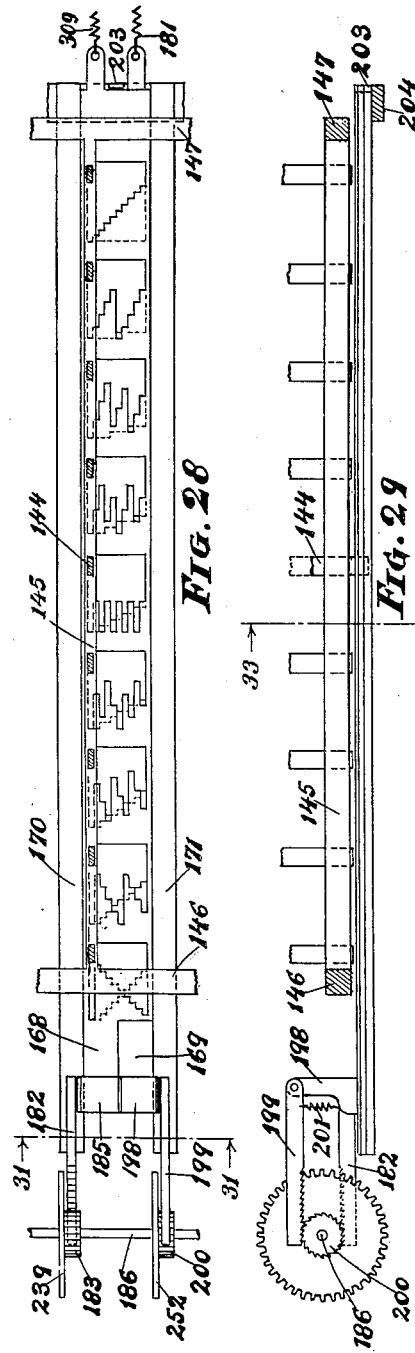
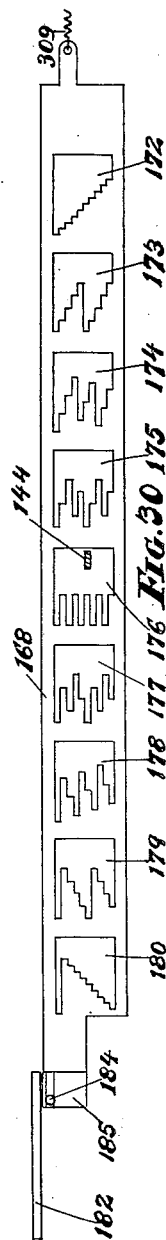
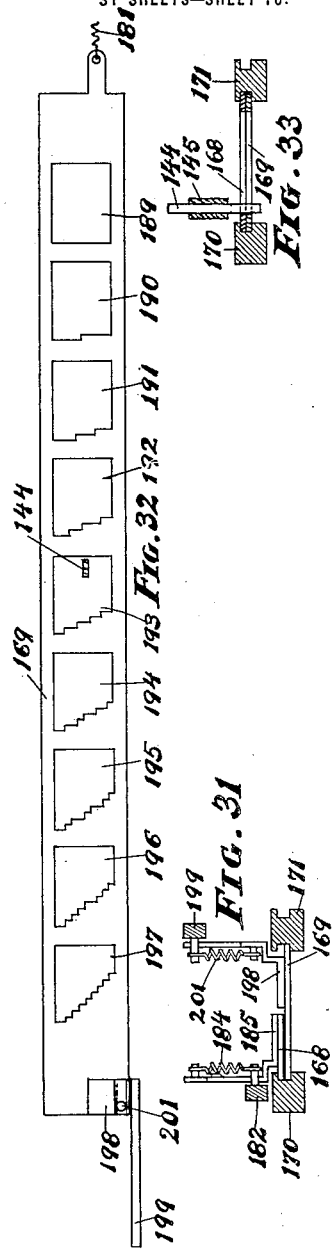
WITNESSES:
Jos. V. Carpenter
Christine A. Braidel.
INVENTOR
Frank L. Martindale
BY
Geo. B. Willcox ATTORNEY

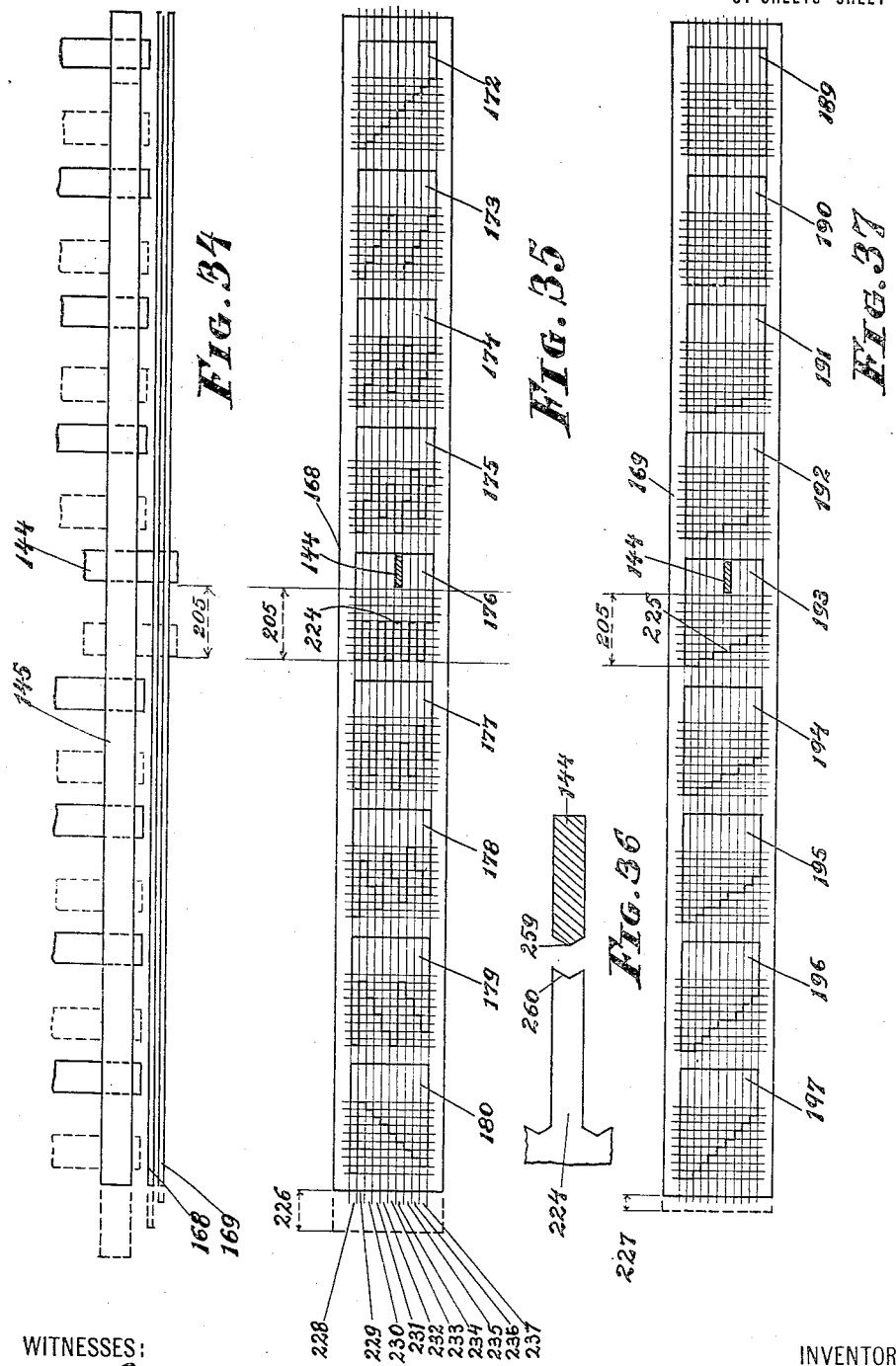

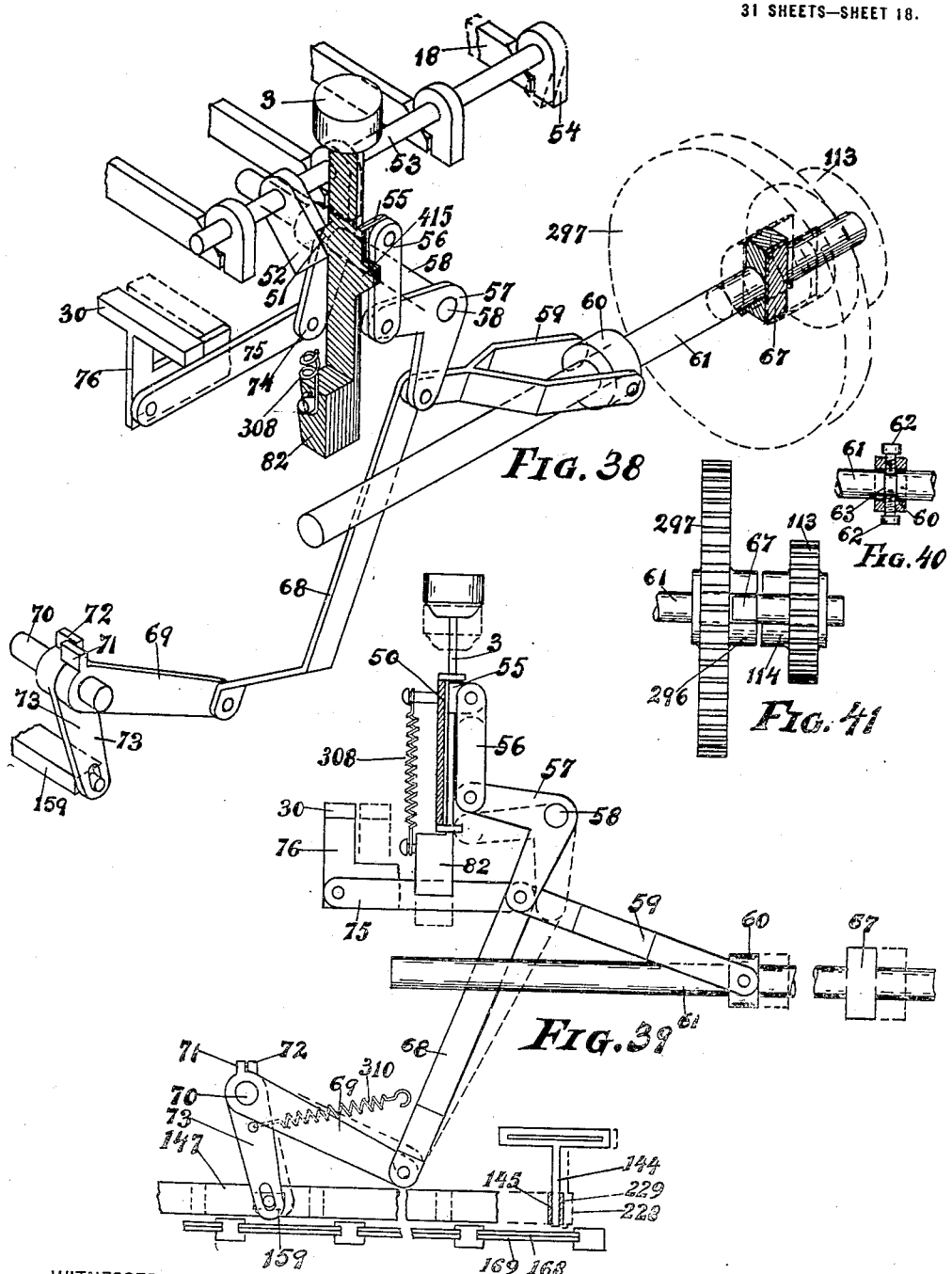

F. L. MARTINDALE.
CALCULATING MACHINE.
APPLICATION FILED AUG. 30, 1912.
1,157,320.
Patented Oct. 19, 1915.
31 SHEETS—SHEET 19.
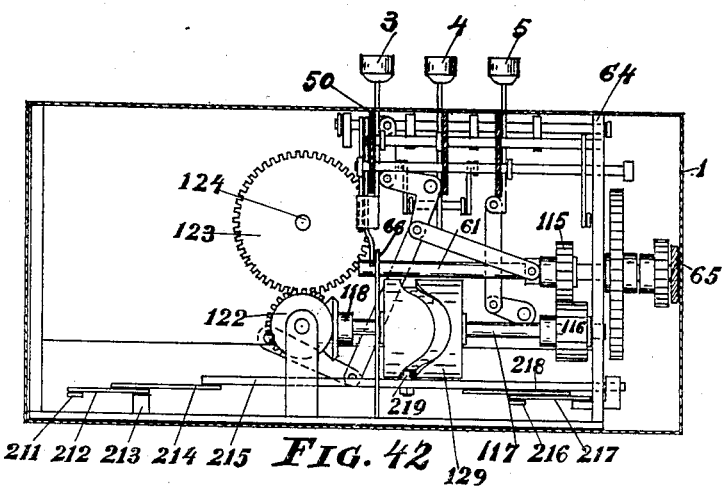
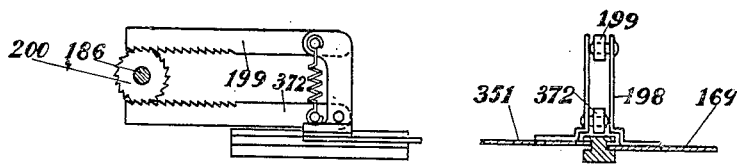
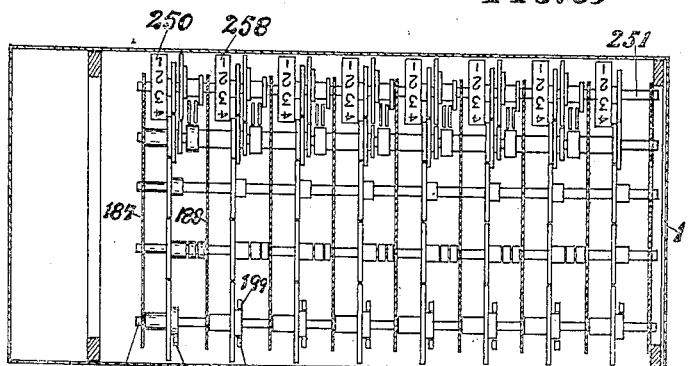
WITNESSES:
INVENTOR
Frank L. Martindale
BY
ATTORNEY

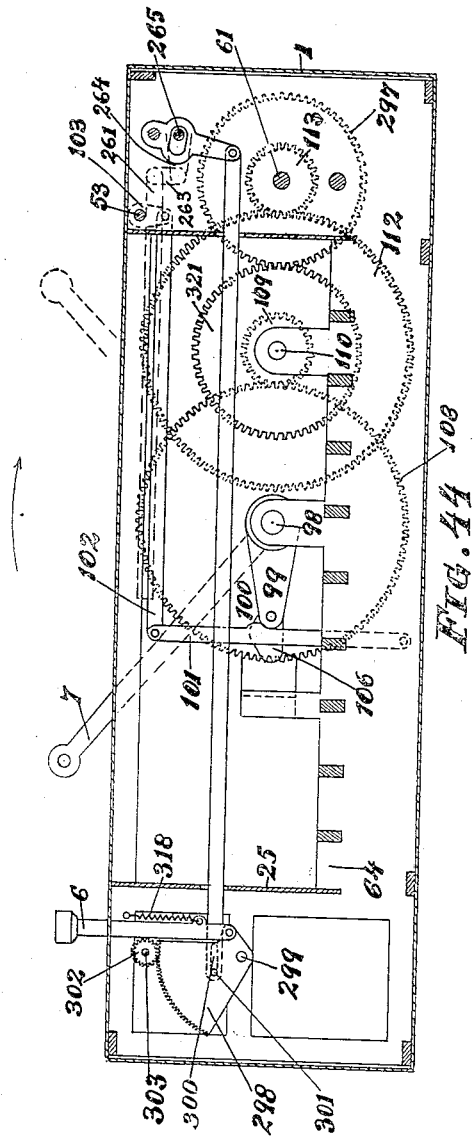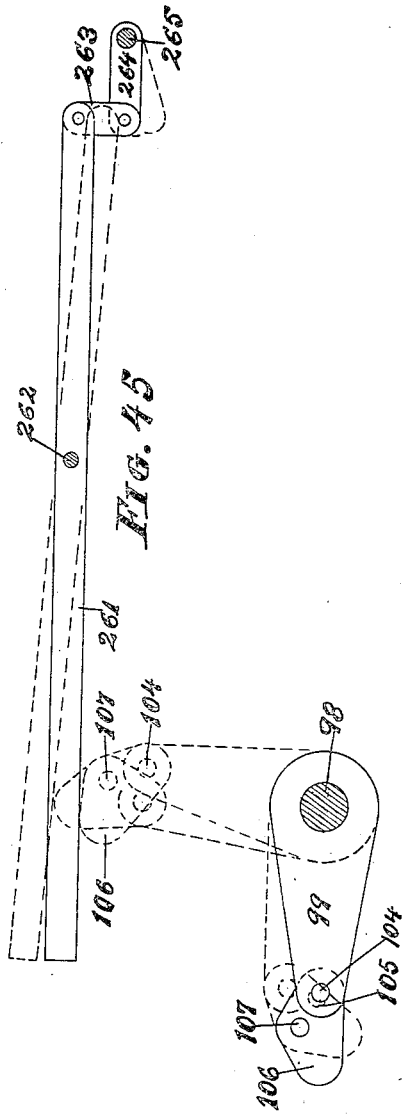

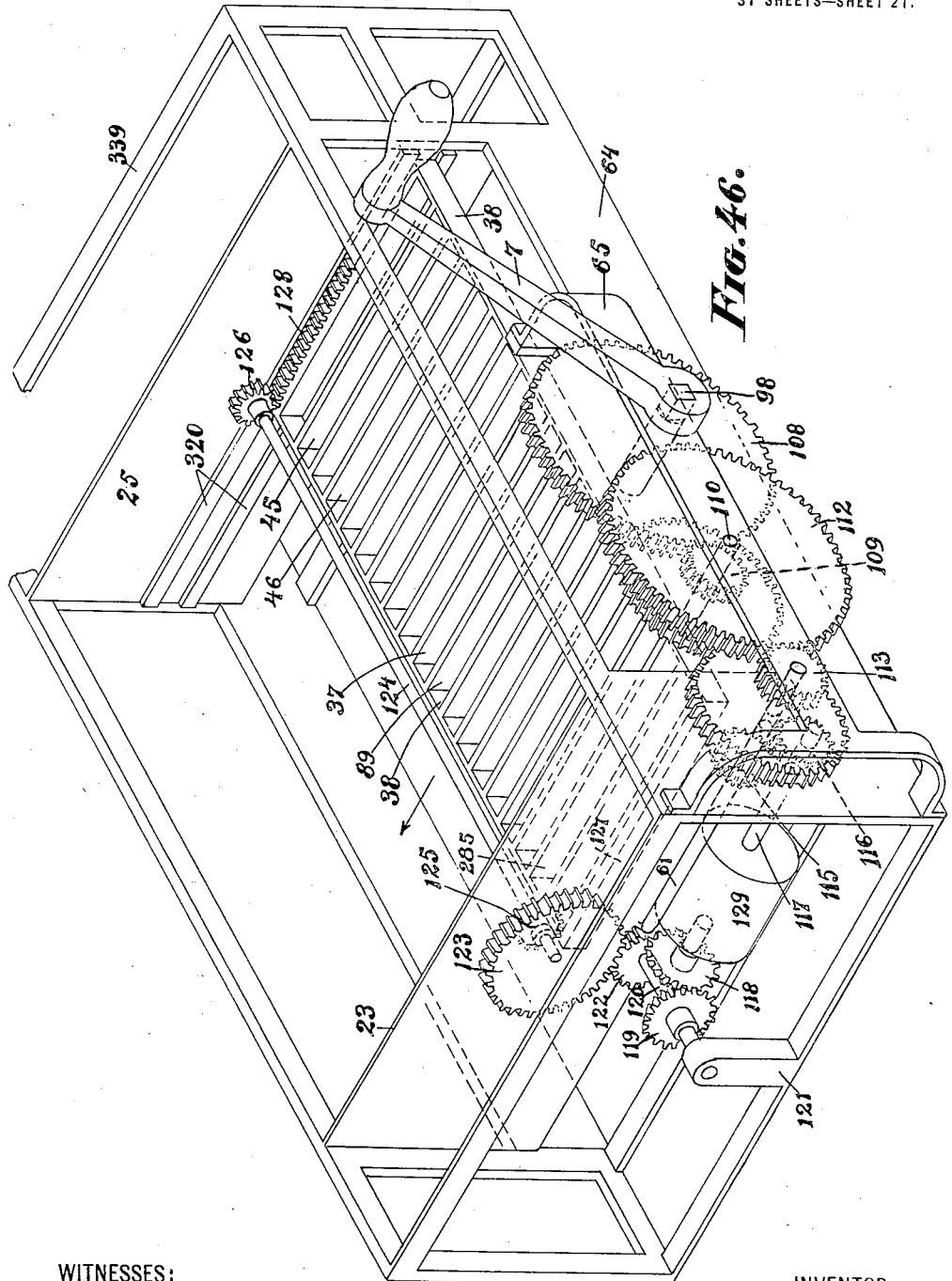

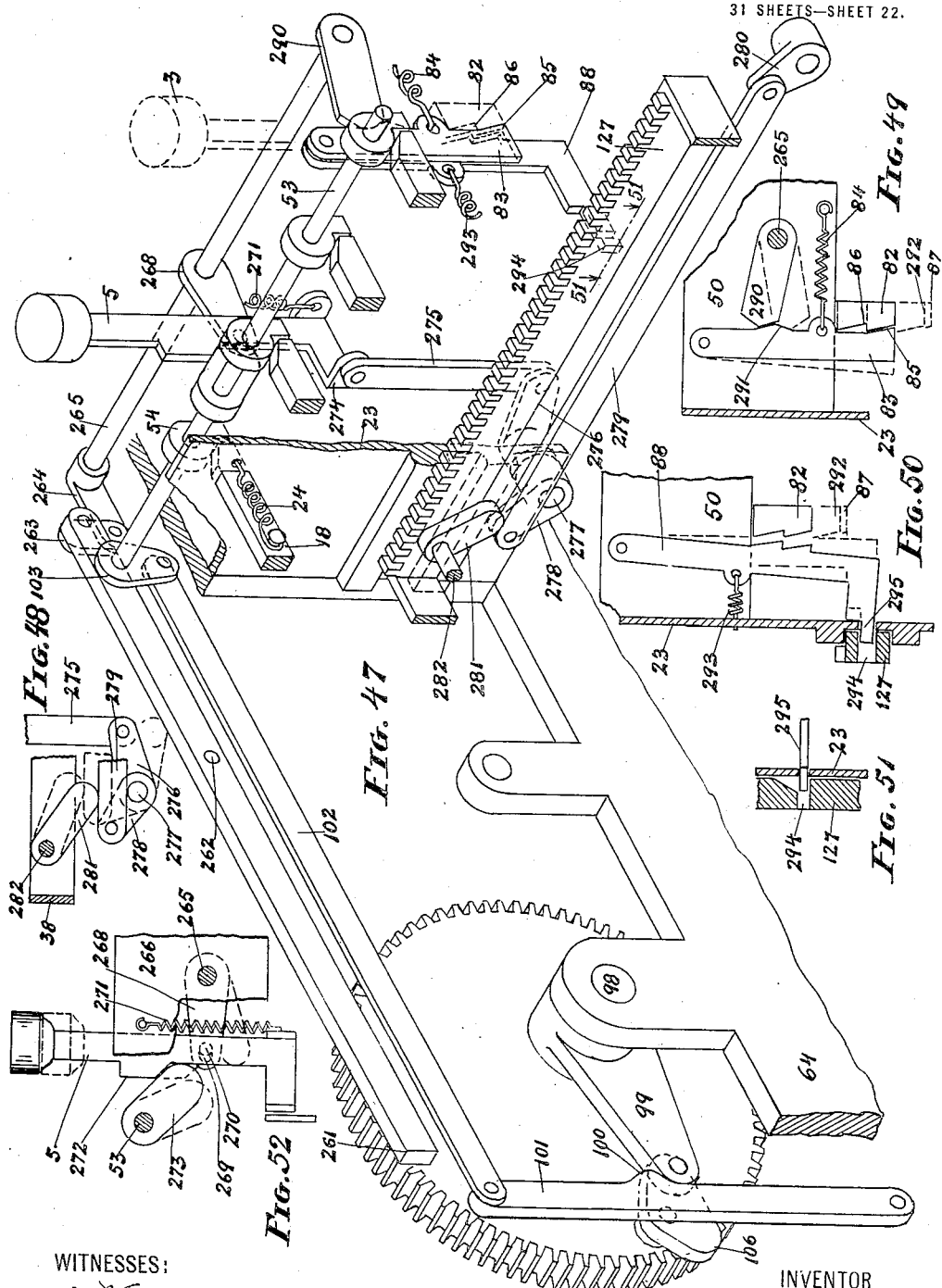

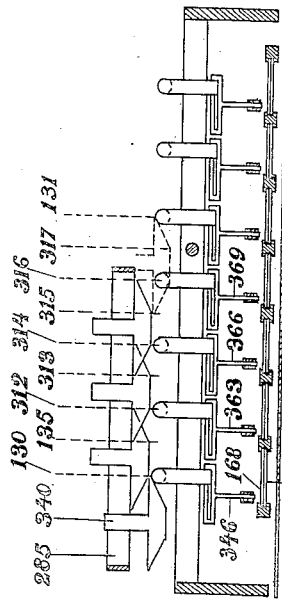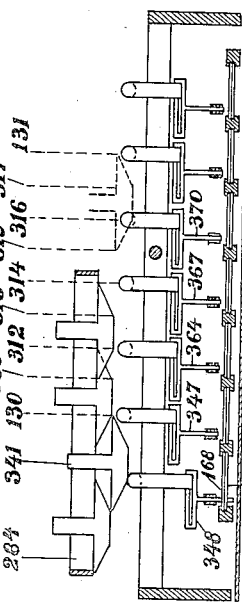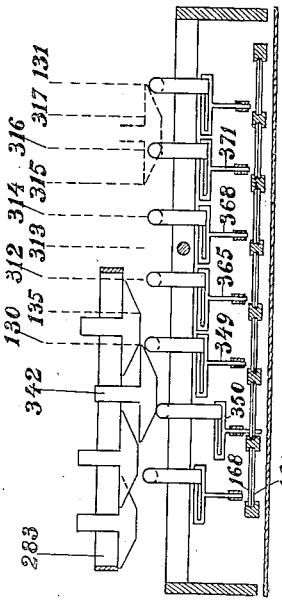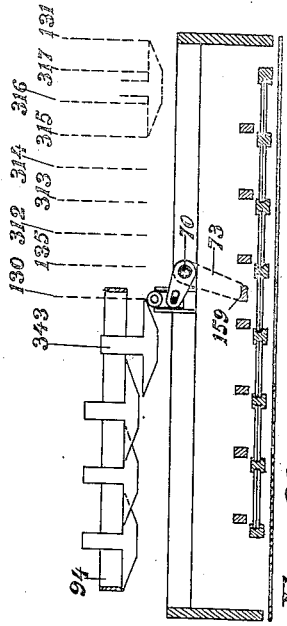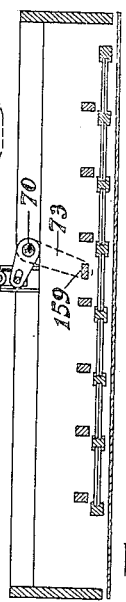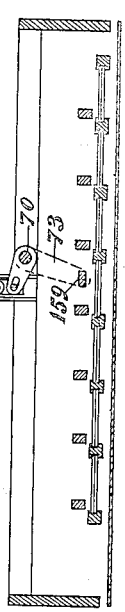

F. L. MARTINDALE.
CALCULATING MACHINE.
APPLICATION FILED AUG. 30, 1912.

1,157,320.

Patented Oct. 19, 1915.
31 SHEETS—SHEET 25.

WITNESSES:
Jos. V. Carpenter
Christine A. Braidel.

INVENTOR
Frank L Martindale
BY
Geo. B. Willey ATTORNEY

F. L. MARTINDALE.
CALCULATING MACHINE.
APPLICATION FILED AUG. 30, 1912.
1,157,320.
Patented Oct. 19, 1915.
31 SHEETS—SHEET 26.
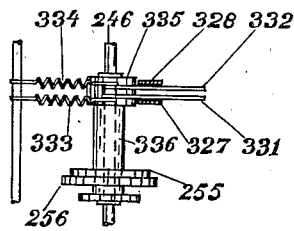
FIG. 70
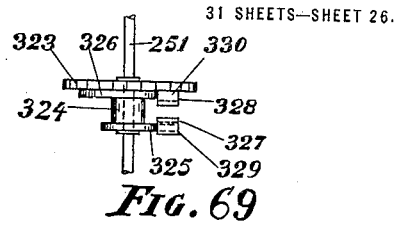
FIG. 69
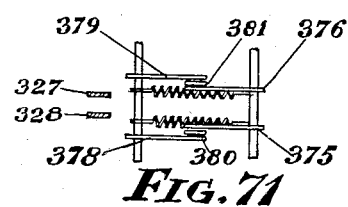
FIG. 71
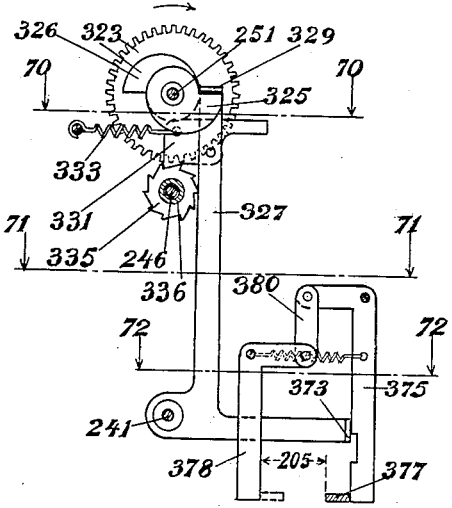
FIG. 68
FIG. 72
FIG. 75
FIG. 73
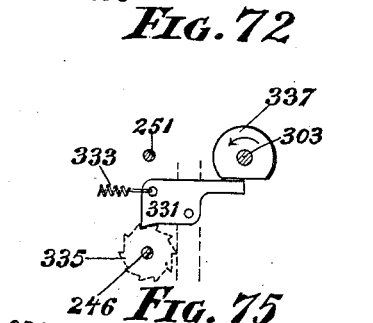
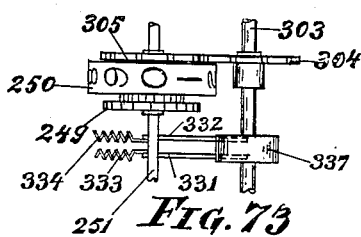
FIG. 76
FIG. 74
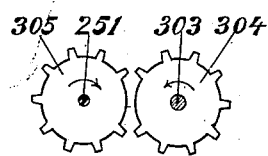
WITNESSES:
Jos. V. Carpenter
Christine A. Braidel
INVENTOR
Frank L. Martindale
BY
Geo. B. Willcox ATTORNEY

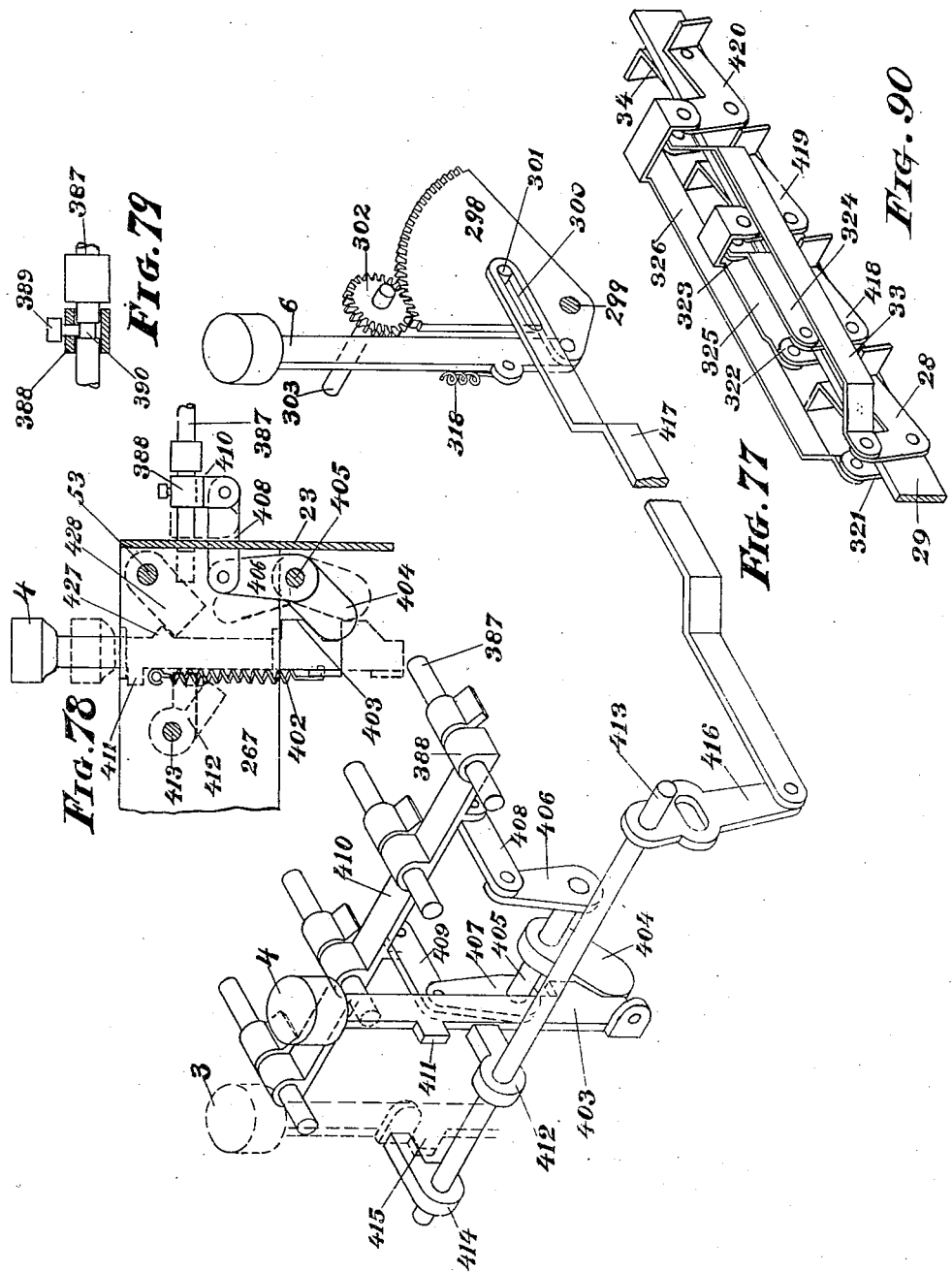

F. L. MARTINDALE.
CALCULATING MACHINE.
APPLICATION FILED AUG. 30, 1912.
1,157,320.
Patented Oct. 19, 1915.
31 SHEETS—SHEET 28.
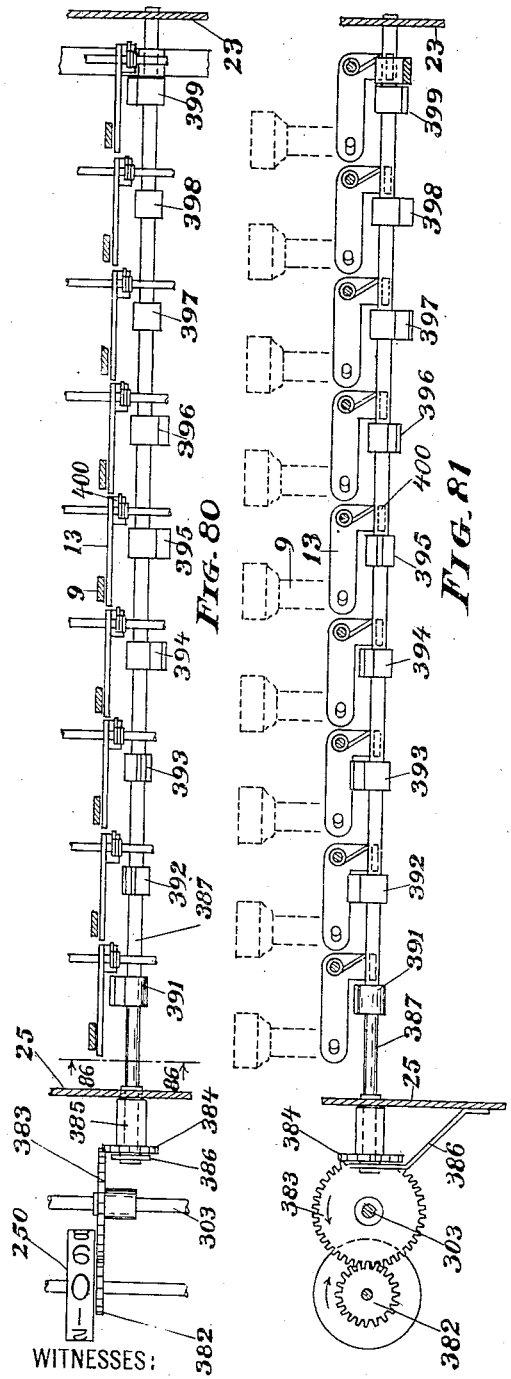
INVENTOR
Frank L. Martindale
BY
Geo B Willey ATTORNEY
WITNESSES:

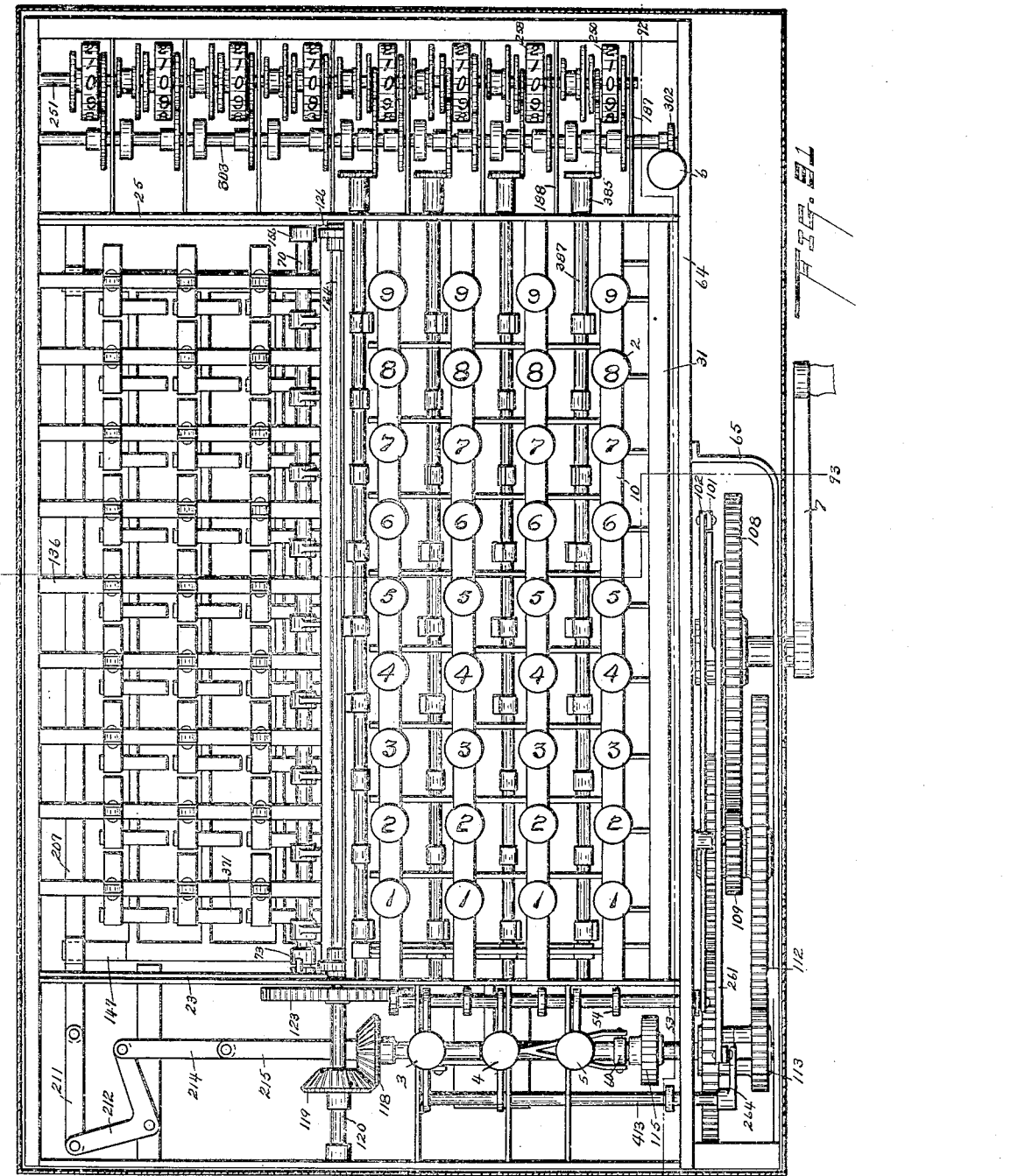

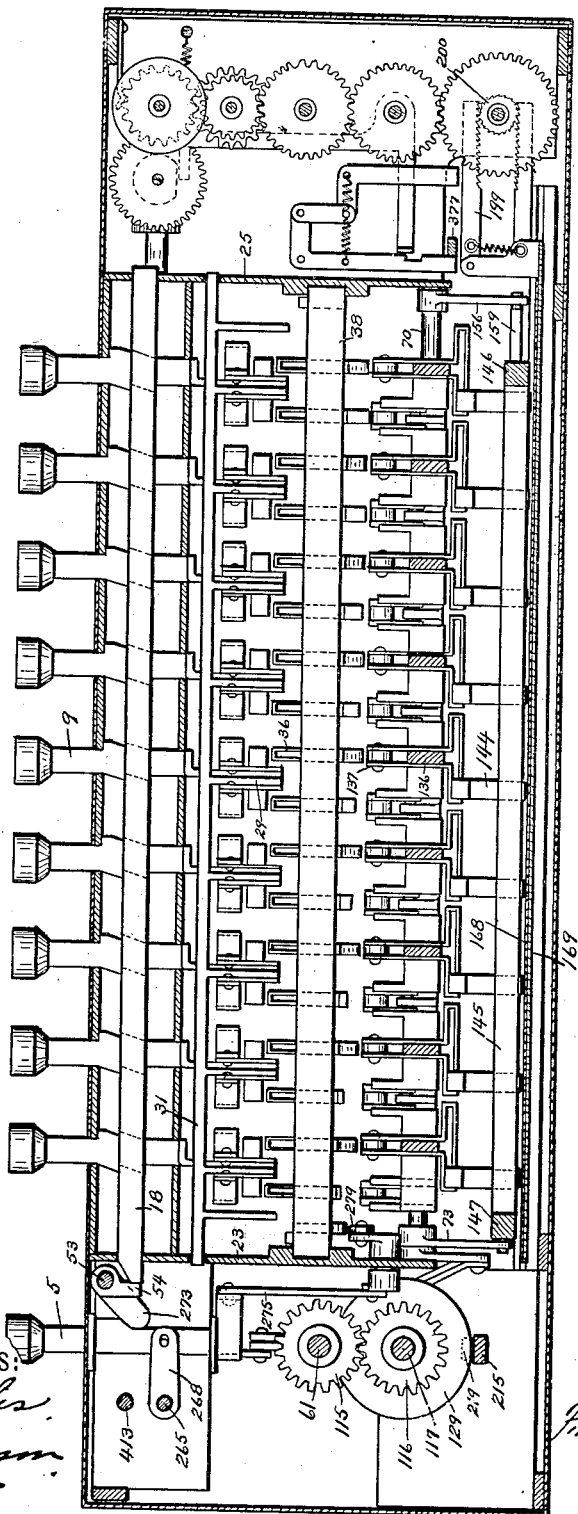

F. L. MARTINDALE.
CALCULATING MACHINE.
APPLICATION FILED AUG. 30, 1912.
1,157,320.
Patented Oct. 19, 1915.
31 SHEETS—SHEET 31.
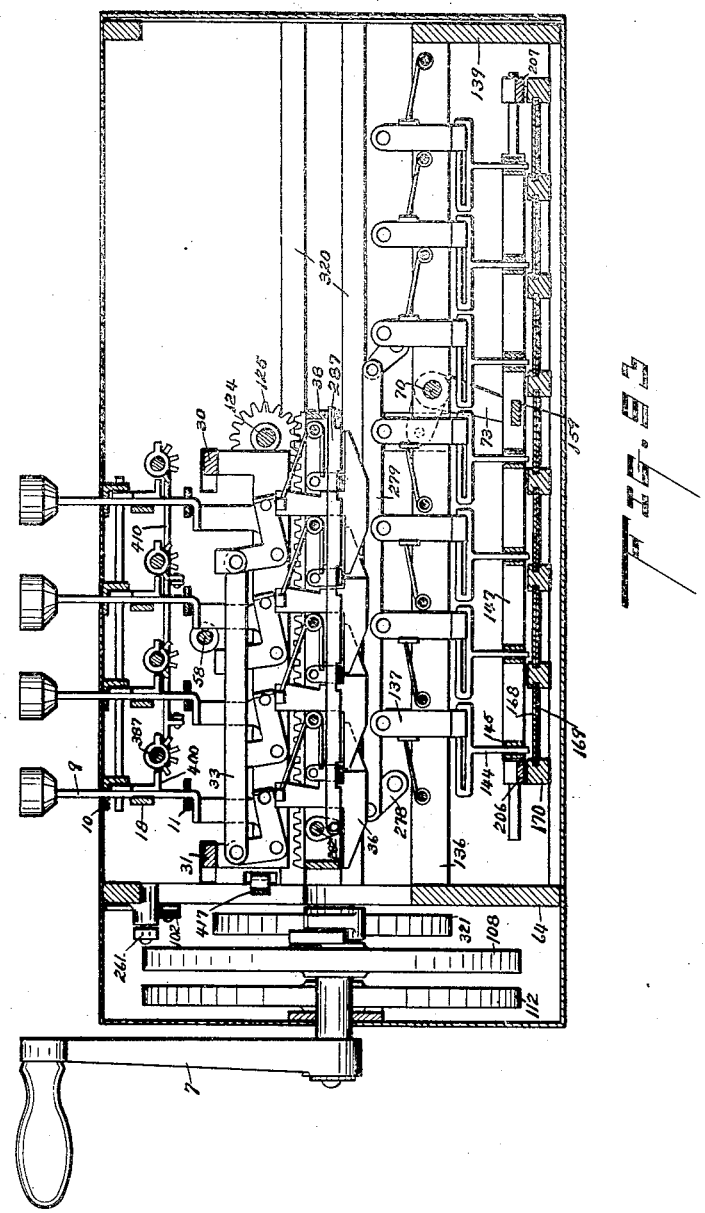
WITNESSES:
INVENTOR
Frank L. Martindale
BY
ATTORNEY

UNITED STATES PATENT OFFICE.

FRANK L. MARTINDALE, OF BAY CITY, MICHIGAN.

CALCULATING-MACHINE.

1,157,320.  Specification of Letters Patent. Patented Oct. 19, 1915.

Application filed August 30, 1912. Serial No. 717,961.

*To all whom it may concern:*

Be it known that I, FRANK L. MARTINDALE, a citizen of the United States, residing at Bay City, in the county of Bay and State of Michigan, have invented certain new and useful Improvements in Calculating-Machines; and I do hereby declare the following to be a full, clear, and exact description of the invention, such as will enable others skilled in the art to which it appertains to make and use the same.

This invention relates to computing machines and pertains more particularly to machines adapted to perform the operations of addition and multiplication.

One of the objects of the invention is to provide in a machine of comparatively simple construction, means by which the following functions may be performed:

A. Straight multiplication of two numbers: A×B=R.

B. Straight addition: A+B=R.

C. Continued multiplication of more than two numbers: A×B×C=R.

D. Addition applied with multiplication: A+B+C+(A×C)=R.

E. Continued multiplication combined with addition: (A×B×C)+A+B+C+D=R.

F. Continued multiplication combined with addition and other multiplications: (A×B×C)+A+B+C+D+(A×D)+(B×C)=R.

A further object is to so arrange the mechanism of the machine that any or all of the above processes may be accomplished without an excessive amount of manipulation of the keys and levers. For illustration, some multiplying machines heretofore constructed required that the working handle or the keys be manipulated for each multiplying operation as many times as there are units in the various digits of the multiplier, thus necessitating a great many manipulations in order to produce one multiplication.

My improved machine performs multiplication by simply setting up the multiplicand and the multiplier on the key-board, the multiplying function and recording function being then completed by a movement of the operating lever, thus doing away with a great amount of manipulation.

Some multiplying machines have been provided with a number of dials, each bearing numbers from 0 to 9, the dials being arranged to represent units place, tens place, and hundreds place, etc., respectively. Such dials have usually been arranged so that the turning of a handle will rotate them to produce the desired product, but it has been necessary to reach the product by making the units dial show consecutively all the units in the answer from one to the final result. For instance, to multiply 6 by 7, the result, 42, has been arrived at by making the unit dial revolve until 42 consecutive units have been shown. This method necessitates a great amount of motion and consequent wear in the machine and delay in securing the final product.

It is one of the objects of my invention to eliminate unnecessary movements of the dial mechanism and to arrive at the result by a mechanical selection of the digits in the answer without going through the process of continued addition as in the types of machines just referred to.

It is obvious that since there are only nine digits, there cannot be more than 9×9=81 different products obtainable by multiplying any two digits together. It is also plain that the greatest product obtainable by multiplying two digits together (namely 81) is represented by a number that contains not more than two digits, that is, units place and tens place, and that the units may be from 1 to 9 and the tens may be from 1 to 9.

The mechanism of my device is so organized that the required unit digit of the product is mechanically selected and the tens digit similarly selected and recorded alongside the unit digit, the result being the correct product. This result, being secured by mechanical selection of one number from the nine possible units and one number from the nine possible tens, it follows, as will be fully set forth, that the movement of the mechanism need only be through nine units to select the unit digit of the product and through nine units to select the tens digit of the product, or through eighteen units in all. Furthermore, since these two operations are accomplished by two members moving simultaneously, the resulting movement of the machine need only be through a maximum of nine places as compared with a corresponding maximum of eighty-one places required in a machine operating by the dial system above referred to. In my improved machine, therefore, I reduce the maximum number of units to be passed by the machine from eighty-one to nine, thereby increasing the speed of operating, reducing wear, and simplifying the process of mechanical multiplication.

With these and certain other objects in view which will appear later in the specification, the invention consists in the devices described and set forth in the claims and the equivalents thereof.

Figure 2:
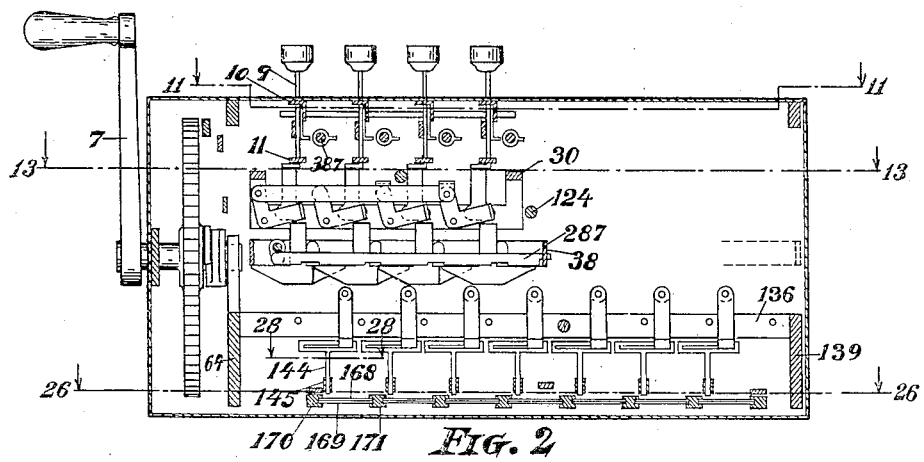
Figure 3:
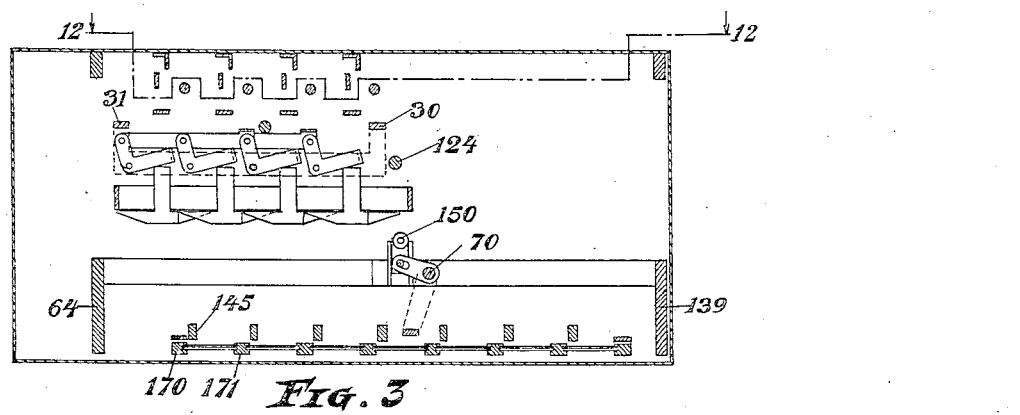
Figure 22:
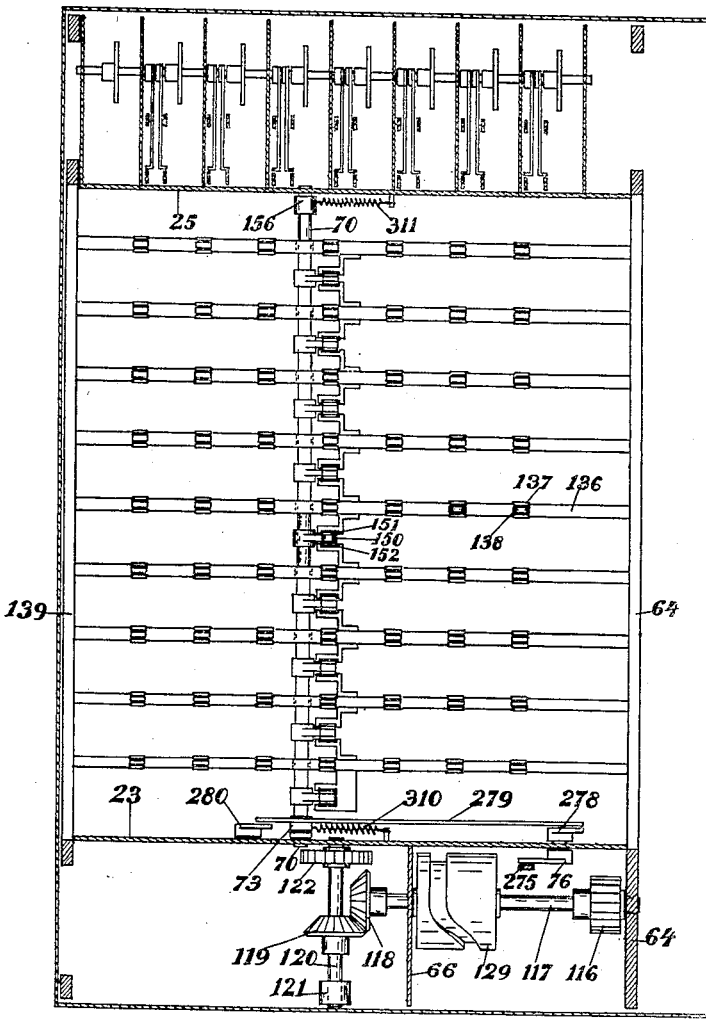
Figure 23:
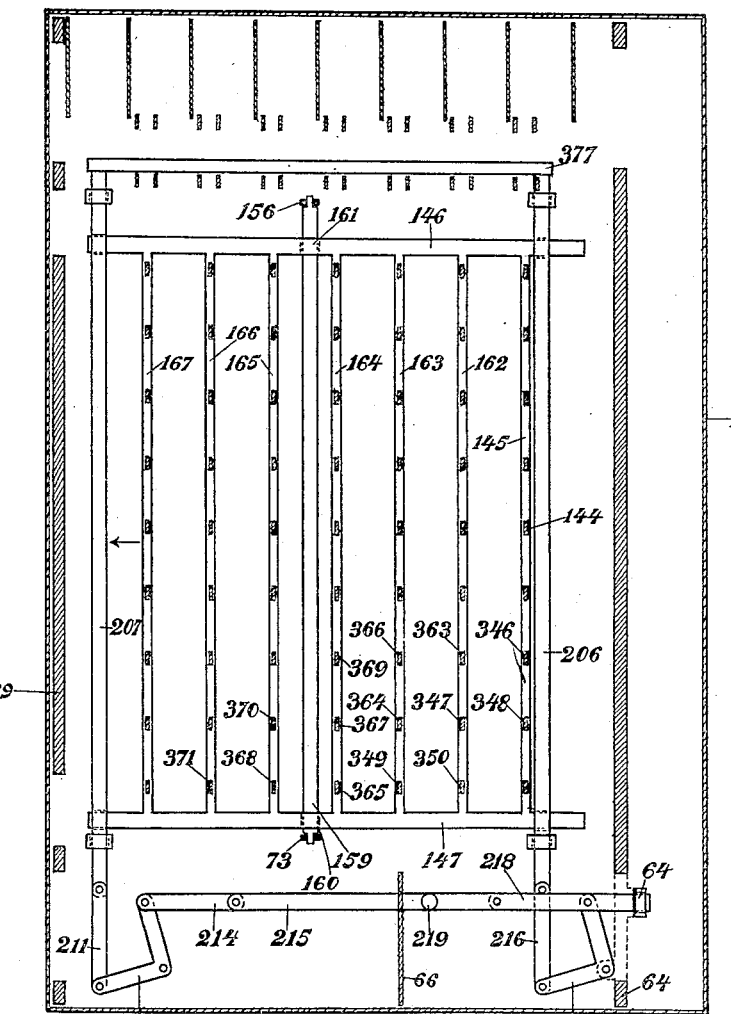
Figure 26:
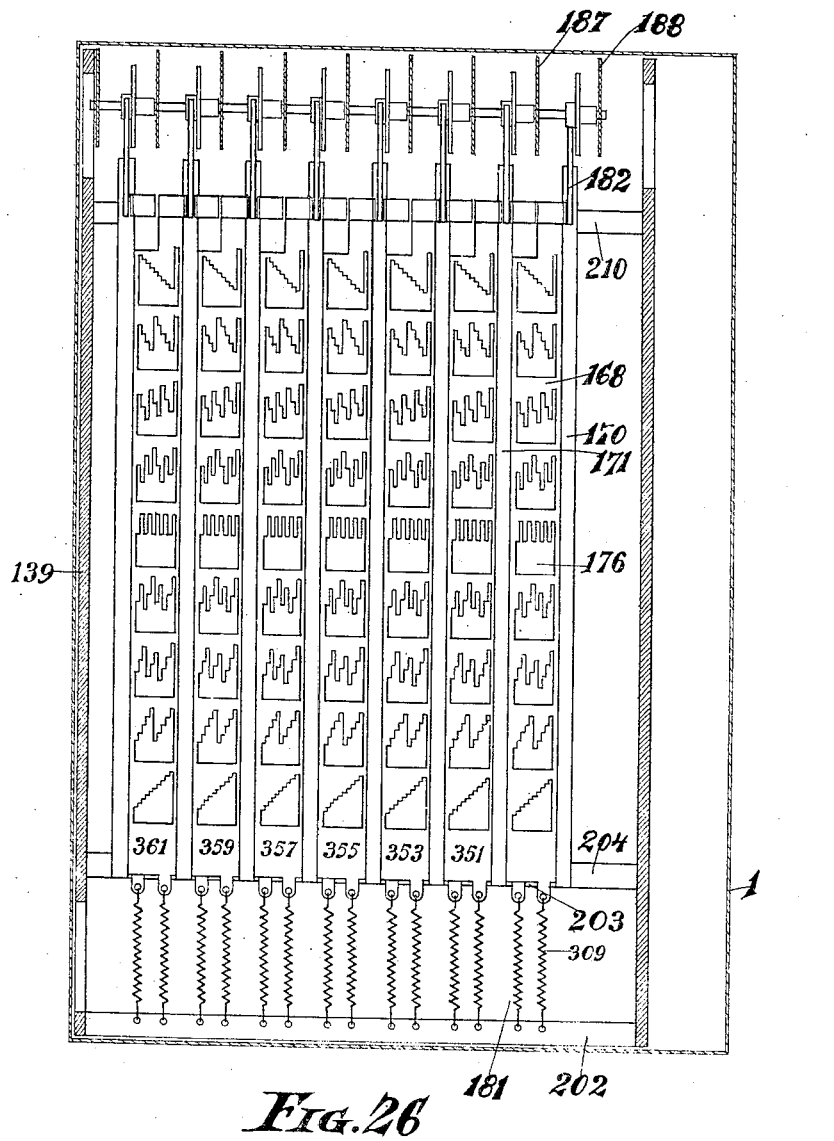
Figure 27:
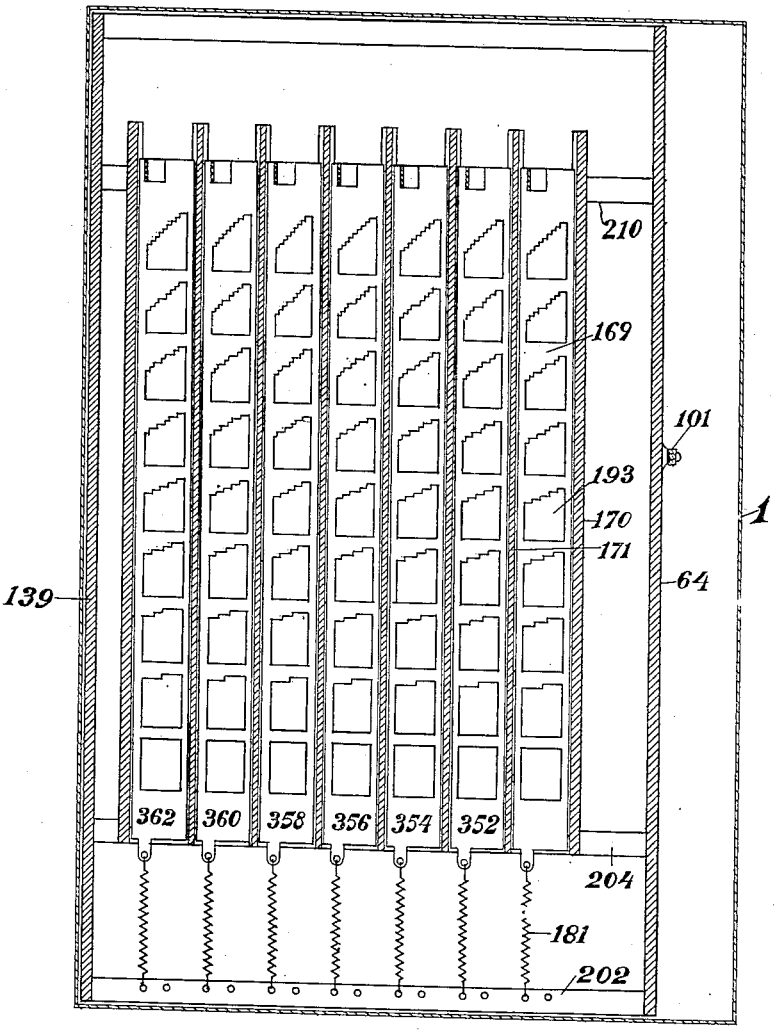
Figure 53:
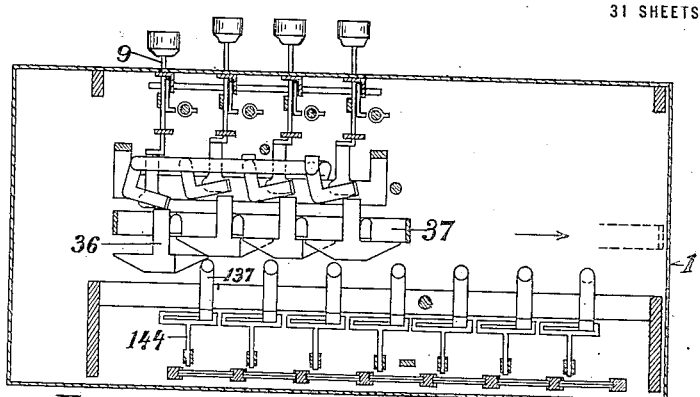
Figure 54:
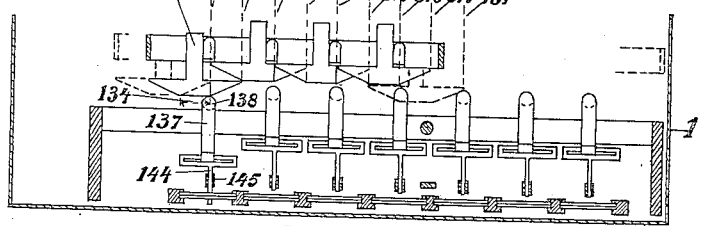
Figure 55:
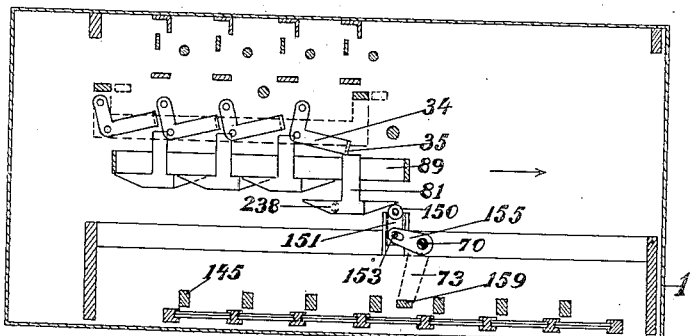
Figure 56:
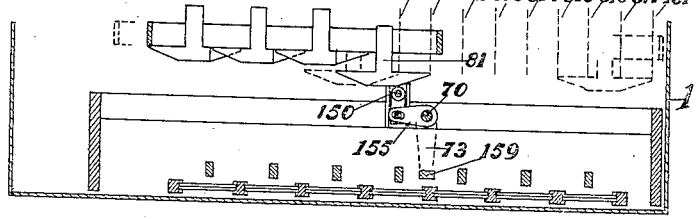
Figure 65:
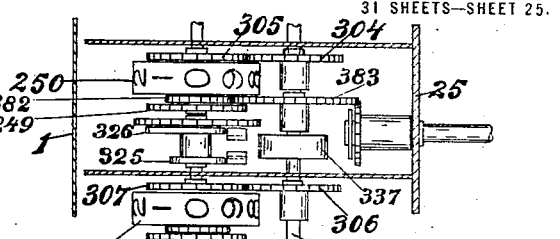
Figure 63:
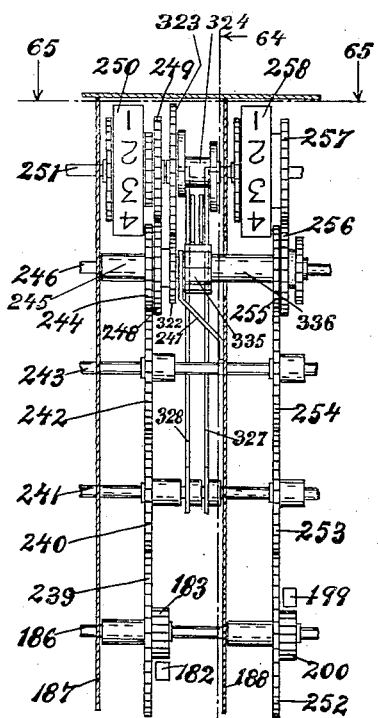
Figure 64:
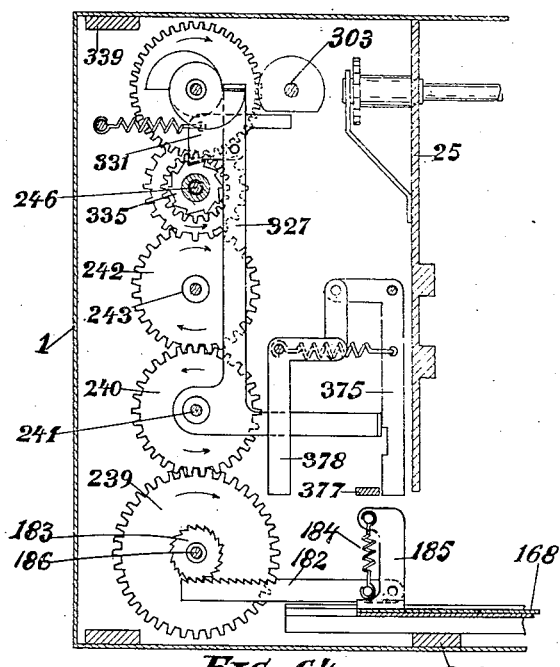
Figures 66, 67:
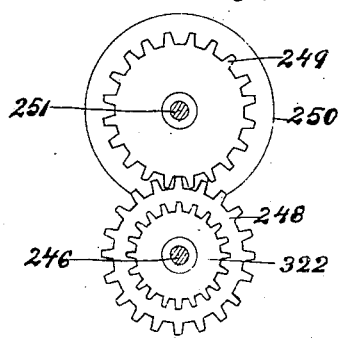

Referring to the drawings, Figure 1 is a top plan view showing the key-board; Fig. 2 is a transverse section on the line 2—2 of Fig. 1, showing the multiplicand riders raised; Fig. 3 is a transverse section on line 3—3 of Fig. 1, showing the multiplier riders raised; Fig. 4 is a longitudinal section on line 4—4 of Fig. 1, showing both sets of riders raised; Fig. 5 is a longitudinal section on line 5—5 of Fig. 1, showing the carriage in end elevation, and also showing the shaft that carries the mechanism by which the latch guiding frame is moved sidewise; Fig. 6 is a perspective detail showing key 5 and its connections; Fig. 7 is a part sectional side elevation showing key 5 and connections, with parts omitted; Fig. 8 is a part sectional front view of the parts shown in Fig. 7; Fig. 9 is a bottom view of the rider shoes shown in Fig. 8; Fig. 10 is a side view in detail showing the rider depressed; Fig. 11 is a part sectional view on line 11—11 of Fig. 2, showing the arrangement of the key-locking bars, with parts removed; Fig. 12 is a part sectional plan view on line 12—12 of Fig. 3, illustrating the arrangement of shafts operated by shift key 4; Fig. 13 is a part sectional plan on line 13—13 of Fig. 2, showing the upper movable frame and the bars carried by it; Fig. 14 is a detached detail showing the manner of mounting the upper movable frame; Fig. 15 is a perspective detail of a multiplicand bar, showing the arrangement of riders on the carriage, the contact members, and the latches; Fig. 16 is a perspective detail of a multiplier bar and the contact members by means of which the riders set the latches in various laterally adjusted positions; Fig. 17 is a part sectional plan view on line 17—17 of Fig. 5, showing the carriage and the gears that operate it; Fig. 18 is an enlarged plan of the carriage; Fig. 19 is a vertical section on line 19—19 of Fig. 18, showing a multiplier bar and its riders; Fig. 20 is a vertical section on line 20—20 of Fig. 18, showing a multiplicand bar and its riders; Fig. 21 is a vertical section on line 21—21 of Fig. 18, showing the rack by which the carriage is moved; Fig. 22 is a part sectional plan view on line 22—22 of Fig. 4, showing the stationary frame that carries the contact members; Fig. 23 is a part sectional plan view on line 23—23 of Fig. 4, showing the latch-guiding frame; Fig. 24 is a perspective view of the latch guiding frame and the cam that actuates it; Fig. 25 is a diagram development of the cam surface; Fig. 26 is a part sectional plan view taken on line 26—26 of Fig. 2, showing the arrangement of the unit digit plates; Fig. 27 is a similar view showing the arrangement of the tens digit plates, the unit digits plates being removed and the guide rail being shown in section; Fig. 28 is an enlarged part sectional plan view on line 28—28 of Fig. 2, showing two plates superposed; Fig. 29 is a side view of the parts shown in Fig. 28; Fig. 30 is a plan of a unit digit plate and its ratchet arm; Fig. 31 is an enlarged sectional view on line 31—31 of Fig. 28, showing the brackets carried by the plates; Fig. 32 is a plan of a tens digit plate and its ratchet arm; Fig. 33 is an enlarged section on line 33—33 of Fig. 29, showing the end of a latch depressed through the openings of two plates; Fig. 34 is a diagrammatic side view showing a pair of plates, and a bar of the latch guiding frame with latches adapted to engage the plates; Fig. 35 is a diagrammatic plan view of a unit digit plate; Fig. 36 is an enlarged detail of a preferred form of latch and stop; Fig. 37 is a plan, diagrammatic, of a tens digit plate; Fig. 38 is a perspective view of shift key 3 and its connections; Fig. 39 is a side elevation of the parts shown in Fig. 38 and their connections to the latch guiding frame; Fig. 40 is a sectional detail of a shaft collar; Fig. 41 is a side view of a pair of gears and the cross-key by which they are locked to the shaft; Fig. 42 is a part sectional rear elevation taken on line 42—42 of Fig. 4, showing the arrangement of the mechanism at the rear of the machine; Fig. 43 is a part sectional front elevation taken on the line 43—43 of Fig. 5, showing the recording mechanism; Fig. 44 is a part longitudinal sectional elevation on line 44—44 of Fig. 17, showing the operating lever and its principal connections; Fig. 45 is an enlarged detail of the arm that releases the key-board and restores to their original positions all the mechanisms except the registering wheels; Fig. 46 is a perspective view broken away in part, showing the principal members of the frame and the gears that move the carriage, the gears being shown diagrammatically; Fig. 47 is a broken perspective detail of release key 5 and the parts operated by it; Fig. 48 is a detail of the connection between key 5 and the carriage; Fig. 49 is a detail of the latch for locking shift key 3; Fig. 50 is a detail of a second latch for locking shift key 3; Fig. 51 is a sectional detail on line 51—51 of Fig. 47, showing the engagement between the carriage and latch 88 of shift key 3; Fig. 52 is a side view broken away in part, of shift key 5; Fig. 53 is a transverse section on the line 2—2 of Fig. 1, with parts omitted, showing rider 36 depressed; Fig. 54 is a part transverse section on the line 2—2 of Fig. 1, showing the carriage moved to depress latch 144; Fig. 55 is a transverse section on line 3—3 of Fig. 1, showing the multiplier riders 81 depressed; Fig. 56 is a part transverse section on line 3—3 of Fig. 1, showing the carriage moved and rider 81 setting the latch guiding frame; Fig. 57 is a diagrammatic view in part section on line 57—57 of Fig. 4, showing the units rider of the multiplicand depressed; Fig. 58 is a similar view on line 58—58 of Fig. 4, showing the tens rider of the multiplicand depressed; Fig. 59 is a similar view on line 59—59 of Fig. 4, showing the hundreds rider of the multiplicand depressed; Fig. 60 is a diagrammatic part-sectional view on line 60—60 of Fig. 5, showing the units rider of the multiplier depressed; Fig. 61 is a similar view taken on line 61—61 of Fig. 5, showing the tens rider of the multiplier depressed; Fig. 62 is a similar view on line 62—62 of Fig. 5, showing the hundreds rider of the multiplier depressed; Fig. 63 is an enlarged detail of that part of Fig. 43 that shows wheels 250 and 258 of the registering mechanism; Fig. 64 is a section on line 64—64 of Fig. 63, showing the gears that connect the plates and number wheels; Fig. 65 is a part sectional plan view on line 65—65 of Fig. 63, showing the registering wheels and connections as seen from above; Fig. 66 is a detail of registering wheel 250; Fig. 67 is a side view of the parts shown in Fig. 66; Fig. 68 is a side elevation of the device for carrying forward a number from one number wheel to the next; Fig. 69 is a view of the parts shown in Fig. 68 as seen from above; Fig. 70 is a part sectional plan view taken on line 70—70 of Fig. 68, showing a detail of the wheels with the cam and its gear removed; Fig. 71 is a part sectional plan view on line 71—71 of Fig. 68, showing the springs for L-levers 375 and 376; Fig. 72 is a section on line 72—72 of Fig. 68, illustrating the movement of bar 377; Fig. 73 is a detail of the device for resetting registering wheel 250; Fig. 74 is a detail of gears 304 and 305; Fig. 75 is a diagrammatic side view of cam 337; Fig. 76 is a side view of the detent spring for wheels 249; Fig. 77 is a perspective detail of shift key 4, wheel resetting key 6 and their connections; Fig. 78 is a side sectional elevation on line 78—78 of Fig. 12, showing key 4 and its connections; Fig. 79 is a detail of collar 388; Fig. 80 is an enlarged detail of shaft 387 and its connections as seen from above; Fig. 81 is an enlarged side view of the same; Fig. 82 is a detail showing hub 385 in side view; Fig. 83 is an end view of hub 385; Fig. 84 is a side elevation of one of the L-levers actuated by shaft 387; Fig. 85 is a sectional end view on line 86—86 of Fig. 80, showing shaft 387; Fig. 86 is a similar view showing a stop alined with an L-lever; Fig. 87 is a perspective detail of the guide that supports the contact members on the stationary frame; Fig. 88 is a side elevation of ratchet wheel 200 and the ratchet arms that operate it; Fig. 89 is a side view of the parts shown in Fig. 88; Fig. 90 is a perspective detail of one of the transverse bars of the upper movable frame with four pairs of L-levers mounted thereon, showing the manner in which the L-levers are linked together. Fig. 91 is a plan view of the machine with the cover removed. Fig. 92 is a longitudinal vertical section on line 92—92 of Fig. 91. Fig. 93 is a transverse section on line 93—93 of Fig. 91.

One of the principal features of my invention relates to the means by which the tens digit and the unit digit of the product of any two units are automatically selected when the keys representing the multiplicand and the multiplier are depressed.

To this end I provide a plurality of dials or wheels, each bearing numbers from 0 to 9, each wheel representing one place such as units, tens, or hundreds in the final product. I provide mechanism for actuating these wheels so that when two numbers to be multiplied together have been successively impressed on the key-board, the unit wheel will move from 0 to the unit number of the product, the tens wheel will move from 0 to the tens number of the product and so on. To illustrate, if it is desired to multiply 6 by 7, the unit wheel will move from 0 to 2 and the tens wheel will move from 0 to 4, indicating the product—42.

To bring about this result the unit wheel has traveled two places and the tens wheel has traveled four places, a total movement of the two wheels of only six places.

The general arrangement of parts and the mode of operation of the machine will be best understood after examining in detail the operation of the mechanism in working concrete examples.

I will first describe the function and mode of operation of the machine in multiplying, and will trace through the machine the movements of the various parts involved in a simple multiplication, for illustration, 5×5=25. In performing this example, the operator proceeds as follows:

First: Depress multiplicand key bearing the number 5 on its face, as shown in the right hand or unit column of Fig. 1.

Second: Punch shift key 3.

Third: Punch multiplier key bearing number 5, in the units column as before.

Fourth: Draw operating lever 7 forward, that is, into the position indicated by the dotted lines in Fig. 1.

Fifth: Return lever 7 to its initial position.

Sixth: Reset the registering wheels by pressing the wheel-resetting key 6.

Upon completion of the fourth operation the product 25 appears at the two right-hand openings as 8, shown at the top of Fig. 1. The fifth operation clears the machine with the exception of the registering wheels.

I will trace through the machine the movements of the parts involved in performing the multiplication 5×5=25, describing first the result of depressing the multiplicand key five of the key-board 2.

*First operation (depressing multiplicand key).*—Reference will be had to Figs. 2, 6 and 7. The shank 9 of key 5 is slidable vertically in openings formed in the upper key-supporting member 10 and the lower key-supporting member 11. The shank 9 is spring-pressed upward by a spring 12 that presses against the lower end of an L-shaped arm 13. This arm is pivoted to key-supporting member 10 and has a slot 14 near one end to receive a laterally projecting pin 15 carried by shank 9. Spring 12 rotates arm 13 to raise shank 9, as shown in Fig. 6. One edge of shank 9 is beveled as at 16 (Fig. 7) and takes against a beveled shoulder 17 on a horizontal longitudinally movable bar 18. Shoulder 17 forms one edge of a channel 20 cut into the side of bar 18. Above the beleved edge 16 is a notch 19 adapted to hook under the lower part of shoulder 17 when shank 9 is depressed, bar 18 being spring-pressed to the right for that purpose. The other edge of channel 20 forms a shoulder 21 adapted to engage the under side of the shoulder 22 on shank 9. The bar 18 is normally spring-pressed to the right, its end being slidingly received in openings of the frame members 23 and 25 (Fig. 11). The bar 18 is connected to the frame member by a spring 24. When shank 9 is depressed, bar 18 is moved to the left, to the position shown in dotted lines in Fig. 7, and notch 19 locks under shoulder 17, thus locking key 9 down. This allows bar 18 to return slightly to the right, but not to its original position. In Fig. 11 there are nine unit keys, all the shanks of which engage bar 18 in the same manner as shank 9, but when shank 9 is depressed, the other eight unit keys were not depressed and the movement of bar 18, caused by depressing shank 9, results in locking the remaining eight keys of the unit column against being depressed until key 9 is released. This is accomplished by the engaging of the remaining eight shoulders 21 of the bar under the shoulders 22 of the remaining eight key shanks. The lower end of shank 9 is formed with a horizontal slot 26, as shown in Figs. 6 and 8. Slidingly received in this slot is a pin 27 secured to one end of an L-lever 28. The L-levers is pivoted to a bar 29 of a member which I term the upper movable frame. This frame comprises, as is shown in Fig. 13, nine intermediate transverse bars similar to 29, supporting L-lever similar to 28, two end transverse bars 76 and 79, and two longitudinal bars 30 and 31 supporting the transverse bars, the ends of the longitudinal bars being slidably received in slots as 80, of members 23 and 25, which are members of the frame of the machine, as shown in detail in Fig. 14. The movable frame can be moved in the direction of the arrow, the slot 26, pin 27, and openings 80 permitting such movement, for a purpose which will be described later. Each transverse bar as 29, of the frame supports four pairs of L-levers (see Fig. 90). The four L-levers as 28, 418, 419 and 420 on the near side of bar 29 are link-connected to L-levers 321, 322, 323 and 34 on the far side by means of links 33, 324, 325 and 326, so that the near levers left to right are connected to the far levers right to left. Thus, lever 28, the left lever on the near side, is connected by link 33 to lever 34, the right lever on the far side, the purpose of which will be later explained. Levers 28 and 34 thus constitute one of the pairs referred to. It will be remembered that lever 28 is connected to the five key of the unit column on key-board 2, similarly 418 connects to the five key of the tens column, 419 connects to the five key of the hundreds column, and 420 to the five key of the thousands column.

In Figs. 6 and 8, L-lever 28, which is pivoted to bar 29 of the movable frame, is shown connected by means of the link 33 to a similar lever 34, which is pivoted to the opposite side of bar 29. Levers 28 and 34 are provided respectively with lateral projections 32 and 35. Shank 9, when depressed, rocks L-levers 28 and 34 and depresses the projections 32 and 35.

Beneath the movable frame of which bar 29 is a member, is a horizontally movable carriage partially shown in Fig. 6. The parts shown comprise end bars 38, 38, and cross-bars 37 and 89. The general arrangement of the carriage is shown in Fig. 17, eighteen cross-bars like 37 and 89 being shown, there being nine of each. This carriage may be moved in the direction of the arrow in Figs. 6, 8 and 17, as will be presently described. The sides of bar 37 are chamfered to form a narrow vertical channel 39 on one side of the bar and a wide channel 40 on the other side. Four sets of such channels are provided on bar 37, and received in each set of channels is a vertically movable member 36 which I term a rider. Similarly four riders as 81 are mounted on bar 89. Each of the riders, as for instance rider 36, is spring-pressed upward by means of a suitable spring 41 which is mounted on a rod 429 extending lengthwise the machine. Pivoted to bar 37 and lying in channel 40 is a latch 42. This latch is preferably L-shaped, having a horizontal projection, the junction of which with the vertical part of the latch forms a heel 43 which is normally pressed against the edge of latch 42 by means of the lower arm of spring 41, as shown in Figs. 6 and 8. The edge of rider 36 is notched as at 44 to receive the heel of the latch when rider 36 is pressed downward by projection 32 of L-lever 28, thus locking rider 36 down, as shown in Fig. 10.

Referring to Figs. 17 and 18, bar 37 is seen to be one of eighteen cross-bars comprising a movable carriage and these bars are arranged in pairs, such a pair 37 and 89 being shown in detail in Fig. 6. Depressing key 9 (Fig. 6) causes projection 32 of L-lever 28 to depress rider 36. Simultaneously, projection 35 of L-lever 34 is depressed, but does not engage rider 81 on bar 89. If bar 29 of the upper frame were moved to the position shown by dotted lines in Fig. 8, so that projection 35 did engage rider 81, then projection 32 would miss rider 36 when depressed by shank 9. When the frame on which L-levers 28 and 34 are mounted is at one end of its travel, rider 36 will be pushed down by depressing key five, and when the frame is at the other end of its travel, rider 81 will be pushed down when key five is depressed. Since in our example, first depressing key five corresponds to the multiplicand and the second depressing corresponds to the multiplier, I therefore term the riders of one bar, such as rider 36 of bar 37 the multiplicand riders, and designate the riders as 81 on bar 89, multiplier riders. I therefore prefer to designate nine of the cross-bars similar to 37 (Fig. 18) the "multiplicand rider bars" and the remaining nine bars similar to 89, the "multiplier rider bars."

In Figs. 17 and 18 the multiplicand rider bars are numbered 45, 46, 47, 48, 37, 49, 283, 284, 285.

The multiplier rider bars are 90, 91, 92, 93, 89, 94, 95, 96, 97.

In review, the result of pressing key five is to press and lock down a predetermined multiplicand rider in the movable carriage, to lock key five down, and to lock the eight remaining keys of the unit column to prevent any other key on the unit column being depressed while key five is down.

*Second operation (depressing shift key 3).*—The purpose of depressing shift key 3 is, first, to release shank 9 and to release the unit column keys which were locked up when key five was depressed. Second, to shift the upper movable frame, of which bar 29 is a member, so that when the multiplier key is impressed on the keyboard, rider 81 will be depressed.

Certain other results are accomplished which will be taken up in their order.

The location of key 3 is shown in Fig. 11.

Referring now to Fig. 39, key 3 is supported in suitable slots of the frame member 50 and is spring-pressed upward by a spring 308. The shank of key 3 carries a beveled projection 51 (Fig. 38) which engages the upper face of an arm 52 fixed to a shaft 53 which is mounted in suitable bearings in the members 50 and 64 of the frame (Fig. 11). In Fig. 38, downwardly projecting arms 54 are fixed to shaft 53. These arms are adapted to push bars 18 to the left. In Fig. 7 bar 18 moves to the left. All bars as 18 move simultaneously and release all keys of the key-board. As key 3 goes down it depresses arm 52, pushing bar 18 to the left, and as it continues, the projection 51 passes beneath the end of arm 52 and releases it. The downward travel of key 3 therefore results in pushing bar 18 to the left and allows it to return. The movement of bar 18 to the left releases key 9. It will be observed in Fig. 7 that the depth of notch 19 is less than the width of shoulder 22 of key 9. Bar 18 may therefore be moved to the left sufficiently to disengage the shoulder 17 from the notch 19 without striking the side of shank 9. When shank 9 rises, it permits bar 18 to be moved by spring 24 to the right (Fig. 7), disengaging shoulders 21 and 22 and thereby unlocking all the keys of the unit column. Depressing key 3 also throws operating lever 7 into gear with the mechanism that actuates the carriage, so that a movement of lever 7 will cause the carriage to traverse the full length of its travel to the left in Fig. 17. The means by which this shifting of the gears is accomplished will now be described.

A lug 55 (Figs. 38 and 39) is provided on the shank of key 3 and is connected by a link 56 with one arm of an L-lever 57, this L-lever being fixed to a shaft 58 carried in suitable bearings of the frame members 23 and 25 (Fig. 13). Referring again to Figs. 38 and 39, the downwardly projecting arm of L-lever 57 is connected by means of a yoke 59 to a collar 60 carried by a shaft 61. This shaft is slidable and also rotatable in bearings provided in the frame members 64 and 66 (Figs. 17 and 42). Collars 60, as shown in section in Fig. 40, surrounds a circumferential groove 63 in the shaft 61, and set screws 62, 62 are provided to engage the groove and permit the shaft to rotate, but not to move longitudinally with relation to the collar. When key 3 is depressed, collar 60 pushes shaft 61 to the right in Fig. 39. Near the end of shaft 61 is fixed a cross-key 67 adapted when shaft 61 is in its normal position, to engage a slot in the hub 296 of a gear 297 loosely mounted on shaft 61 (Fig. 41) and when shaft 61 is pushed to the right in Figs. 17, 39 and 41, key 67 engages a slot in the hub 114 of a gear 113 which is also loosely mounted on shaft 61.

The operation of the gears in detail will be described later.

To the downwardly projecting arm of L-lever 57 (Fig. 39) is pivoted a link 68 operating a frame termed the latch guiding frame, which will be discussed further in the specification. The shaft 58, when rocked by the depressing of key 3 as above described, also moves horizontally the sliding frame of which bar 29 is a member. This movement will be understood by referring to Figs. 13, 38 and 39. A pair of arms 74 and 77 are fixed to shaft 58, the ends of the arms being connected to links 75 and 78 respectively, the outer ends of the links being pivoted to the end bars 76 and 79 of the movable frame. The purpose of this movement is to shift the movable frame of which cross-bar 29 is a member, so that all keys of the key-board will be thrown into operative positions with relation to the multiplier riders. Shift key 3 having been depressed as above described, it is locked in its down position. The purpose of locking key 3 down is to hold cross-key 67 of shaft 61 into engagement with gear 113, as in the foregoing description, and also to hold the movable frame so that the key-board will operate the multiplier set of riders only. A further purpose is to allow the latch guiding frame to be returned by springs 310 and 311 (Figs. 39 and 22) to what may be termed its zero position, as will be described later.

In Figs. 38 and 39 the lower end of the shank of key 3 is provided with a projection 82 to which the lower end of spring 308 is connected.

Referring to Figs. 49 and 47, 83 is a latch pivoted at its upper end to member 50 of the frame of the machine. The latch is actuated by means of a tension spring 84. 85 is the toe of the latch 83. 86 is a notch formed in the side of projection 82 adapted to engage the toe 85 when 82 is pushed down to position 87 by the depressing of key 3. 88 (Figs. 47 and 50) is a second latch also pivoted to frame member 50 and actuated by means of a tension spring 293. The purpose of latch 88 will be explained in the latter part of this example.

In review, the operations performed by depressing key 3 were, first, to release the shank 9 of key five; second, to release the remaining eight keys of the unit column; third, to throw the operating lever into engagement with the movable carriage so as to enable the carriage to move through its full travel; fourth, to shift the upper movable frame and thereby throw the key-board out of register with the multiplicand set of riders and into register with the multiplier set of riders; fifth, to lock key 3 in its down position and thereby lock the various parts above described, in their set positions; sixth, to release the latch guiding frame and permit it to return to its zero position.

*Third operation (depressing multiplier key).*—Referring to Figs. 6 and 8, the projection 35 of L-lever 34 being now in register with multiplier rider 81, depressing key five will depress rider 81, the latter being locked down in the same manner as described for rider 36. The remaining eight keys in the units column are likewise locked in their raised position by means of bar 18 in the same manner as has been previously described. Key five having been depressed and multiplier rider 81 having been locked in its down position on bar 89, reference may be had to Figs. 17 and 18. Rider 36 is one of the multiplicand set. Rider 81 is one of the multiplier set. Fig. 17 shows that rider 36 is the right-hand rider of the set of four on bar 37, and 81 is the left-hand rider of the set of four on bar 89. Both 36 and 81 are riders actuated by a key of the units column of the key-board. The tens, hundreds, and thousands riders are to the left of rider 36 on bar 37 and to the right of rider 81 on bar 89.

The mechanism by which the levers are connected in pairs is shown in Fig. 90, which has already been described. Thus the arrangement of the riders corresponds to the arrangement of the pairs of L-levers.

The order of arrangement of the multiplier and multiplicand riders is reversed on their respective bars for a purpose to be set forth later.

*Fourth operation (drawing lever 7 forward).*—When lever 7 is drawn forward, that is, into the position shown in dotted lines in Fig. 1 and in the direction of the arrow in Fig. 44, a number of functions are performed which will now be explained, together with the mechanism employed. 98 is the shaft of arm 7, mounted in suitable bearings in the frame members 64 and 65 (Fig. 17). In Fig. 44, shaft 98 carries an arm 99, the end of which engages the projection 100 of a lever 101 pivoted at its lower end to the side of frame member 64, as indicated in Fig. 27. To the upper end of lever 101 (Fig. 44) is pivoted a link 102, the other end of which is pivoted to a downwardly projecting arm 103 fixed to shaft 53. When lever 7 is drawn forward, arm 99 is raised, forcing lever 101 back, or to the left in Fig. 47, rocking arms 54 and moving the bars 18 endwise to release all of the keys of the key-board. The releasing of the keys, as for illustration key 5 (Fig. 6), lifts projection 35 clear of rider 81 and clear of the other parts of the carriage, so that when the carriage is moved through its travel by lever 7, projection 35 will be clear of the moving parts. The drawing forward of lever 7 and the lifting of arm 99 (Fig. 45) turns gear 108 which is loose on shaft 98, but does not impart any movement to the gear until after arm 99 has engaged projection 100 and released the keys in the manner just described. To produce this result I provide near the end of arm 99 (Fig. 45) a laterally projecting pin 104 received in the slotted opening 105 of a pawl 106 which is secured by means of a pivot 107 to the face of gear 108 (Fig. 44). The pawl connection permits the partial upward movement of arm 99, during which link 102 is actuated before any movement is imparted to gear 108. Gear 108 meshes with a pinion 109 fixed to shaft 110 which is mounted in a suitable bearing 111 of frame member 65 (Fig. 17) and in a similar bearing in frame member 64. Fixed to shaft 110 is a gear 112 meshing with a pinion 113 loosely mounted on shaft 61. The ratio of the train 108, 109, 112 and 113 is such that the forward movement of lever 7 revolves pinion 113 four turns.

It may be remarked here that gear 297 loose on shaft 61 is also driven by gear 321 which is fixed to pinion 109, the ratio being such that the forward movement of lever 7 will turn gear 297 one revolution. As has previously been described, shaft 61 may be thrown into gear with either pinion 113 or gear 297 by endwise movement of the shaft which puts cross-key 67 into engagement with the hubs 114 or 296 of the respective gears, as is clearly shown in Fig. 41.

Referring to Figs. 42, 17 and 46, gear 115 is fixed to shaft 61 and meshes with gear 116 fixed to shaft 117. The face of gear 116 is of sufficient width to permit 115 to be moved along with shaft 61 as previously described, while remaining in mesh with 116. Shaft 117 is mounted in suitable bearings in the frame members 64 and 66, shown also in Fig. 22. Upon the end of shaft 117 is fixed a bevel pinion 118 meshing with a second bevel pinion 119 fixed to shaft 120 which is rotatably mounted in members 121 and 23 of the frame. A gear 122 which drives gear 123 (Fig. 42) is fixed to shaft 120. Gear 123 is fixed to a shaft 124 revolubly mounted in frame members 23 and 25. Upon shaft 124 is fixed a pair of pinions 125 and 126 (Figs. 17 and 46) which mesh respectively with two racks 127 and 128 carried by the movable carriage upon which the multiplicand and multiplier riders are mounted. It is thus seen that the forward movement of lever 7 rotates pinions 125 and 126 and moves the carriage horizontally in the direction shown by the arrow in guides 319 and 320 on the sides of frame members 23 and 25, Figs. 4 and 46.

The detail construction of the carriage and the mounting of racks 127 and 128 will be understood by reference to Figs. 18 and 21.

Upon shaft 117 is mounted a cam 129, the purpose of which will be set forth later in the specification. The location of the cam is shown in Fig. 42. The ratio of the intermediate gearing between shaft 117 and the carriage is such that the carriage moves its full travel while shaft 117 and cam 129 turn through four revolutions. The ratio between shafts 61 and 117 is one to one, so four turns of gear 113 as in the example under discussion will turn shaft 117 four revolutions.

It will be recalled that in the present example, namely $5 \times 5 = 25$, that the multiplicand rider 36 carried by cross-bar 37 of the carriage was depressed first and that rider 81 carried by cross-bar 89 was depressed next. These depressed positions of riders 36 and 81 are shown in Figs. 53 and 55 respectively. In the forward travel of the carriage, all of the riders are carried along bodily, although only such riders as have been depressed, in this case 36 and 81, have any effect in operating the mechanism beneath the carriage.

A more complete detail of rider 36 is shown in perspective in Fig. 15, in which the dotted lines show the position of the rider when up, the full lines showing the rider down. 130 to 131 indicates the total travel of the carriage.

The construction of the lower part of rider 36 is shown in Fig. 10, in which 132 is an upwardly beveled face of one end of the foot of the rider, 133 is the similarly upwardly beveled opposite end of the rider, one side of this beveled end being chamfered, as shown in Fig. 9, in order to allow consecutive riders to overlap in the manner indicated in Fig. 8. 134 indicates the horizontal lower working face of the rider. Referring to Fig. 15, the carriage travels from 130 to 131, the total travel being divided into eight equal parts, as consecutively from position 130 to 135, 312, 313, 314, 315, 316, 317, 131. The cross-bars as 37, of the carriage are located above and parallel with corresponding fixed bars, as 136, secured to the frame members 64 and 139 of the machine. The arrangement of these fixed bars is illustrated in Fig. 22. Each set of four multiplicand riders on the carriage is located above a set of seven vertically movable contact members 137 mounted in grooves on the sides of bar 136 of the frame. Each of the members 137 is spring-pressed upwardly by means of a spring 140 engaging a lug 141 on the member. At the upper end of each member is a roller 138 adapted to be engaged by the lower working face of rider 36 when the carriage is moved through its travel. The lower end of each member 137 projects laterally each side of bar 136 and is formed with a horizontal hoop 142 to engage the upper slotted end 143 of a vertically movable latch 144, this latch being slidable up and down in an opening formed in the cross-bar 145 of a movable latch guiding frame. The latch guiding frame is shown in detail in Fig. 24 and the purpose of the frame will be presently described. 145 is one of seven cross-bars which, together with the end bars 146 and 147 to which they are secured, form a horizontal frame by which the latches 144 are guided. The latch guiding frame is movable both longitudinally and transversely, the slot 143 and the loop 142 permitting this movement of the latches.

When the traveling carriage is moved through its travel by the lever 7, the depressed rider 36, traveling over roller 138, will push down member 137 and latch 144, and similarly the three succeeding latches will be depressed while the carriage is traveling from 130 to 131, as shown in Figs. 15 and 53.

It will be noted that although there are seven members as 137 in a row, the length of travel of the carriage is such that any one of the four riders of a row, as 36 will contact successively with only four of the said seven members.

Having described the operation of the multiplicand rider, I will now describe the operation of the multiplier rider.

Referring to Figs. 55 and 16, when the carriage moves in the direction of the arrow, that is from 130 toward 131, the beveled face of the shoe of rider 81 will travel over roller 150, depressing it during the first one-eighth of the travel of the carriage, that is from 130 to 135. Roller 150 is revolubly mounted between two side plates 151, 152 (Fig. 87), the plates being connected at their lower ends by a pin 153 and vertically slidable in suitable guides on the side of bars 136 (see also Fig. 22). In Fig. 16, surrounding the pin 153 is the slotted end 154 of arm 155 fixed to shaft 70. When the roller is depressed, shaft 70 is rocked. The shaft is mounted in bearings in the cross-bars as 136 and in the frame members 23 and 25 (Fig. 22). Fixed to shaft 70 is a pair of arms 73 and 156 (Figs. 22 and 16) slotted at their lower ends as at 157 to receive the projecting ends as 158 of a bar 159, which is shown in Fig. 23. The bar 159 may be moved laterally by the rocking of arms 73 and 156, carrying the latch guiding frame with it, the bar being slidably received in suitable bearings as 161 and 160 of the end bars 146 and 147 of the latch guiding frame. Arm 73 is drawn to the right in Figs. 39 and 22 by spring 310, and arm 156 is drawn to the right in Fig. 22 by spring 311. The latch guiding frame is thus normally spring-actuated to the right in Fig. 23. The latch guiding frame may move in a direction lengthwise of bar 159 by reason of bearings 160 and 161.

As is shown in Fig. 23, the frame consists in the cross-bars 145, 162, 163, 164, 165, 166, 167, and the end bars just referred to. The movement imparted to arms 73 and 156 by the depressing of roller 150 draws the frame to the left, or in the direction of the arrow in Fig. 23, thus positioning latch 144 transversely, for a purpose presently to be explained.

Referring to Fig. 8, 238 represents the thickness or depth of the shoe of rider 81 and it follows that by varying the depth 238 of the successive riders that the latch guiding frame and latches, as 144 carried by it, may be set in different transverse positions corresponding to the thickness (238) of the rider shoes.

Referring to Fig. 5, it will be seen that alternate bars as 90, 91, 92, etc. of the carriage, being the bars that carry the multiplier riders, are located directly above the rollers, as 150, that produce the transverse movement of the latch guiding frame, which has just been described. On bar 89 all of the rider shoes have the same depth (238) as shown in Fig. 55, so that any one of these riders, when depressed, will produce the same movement of roller 150 and consequently the same transverse setting of the latch guiding frame. But the riders on any other of the multiplier rider bars of the carriage, as bar 94 (Fig. 5) have a different thickness of shoe (238) and consequently any one of the four riders on bar 94 will produce a different transverse setting of the latches actuated by it than is produced by the riders on bar 89.

Since nine of the eighteen bars of the carriage carry multiplier riders, it follows that a movement of the carriage may set the latch guiding frame in any one of nine transverse positions, depending upon which one of the nine sets of four multiplier riders is depressed.

Having shown how latch 144 is depressed and how it has been moved to a lateral position corresponding to the depressing of multiplier key 5, reference may now be had to Fig. 24, which shows the detail construction and the mounting of the latch guiding frame.

As has been explained, the frame proper consists in the end bars 147 and 146 and the cross-bars 145, 162 to 167. The projecting ends of bar 146 are slidingly received in bearings 149, 149 carried by supporting bars 206 and 207, so that the frame may move in a direction lengthwise the bar 146. Similar bearings 148, 148 support bar 147. Bars 206 and 207 are longitudinally movable in bearings 208, 208 and 209, 209 secured respectively to frame members 204 and 210, these frame members being also shown in Fig. 5. It is thus seen that the latch guiding frame not only has transverse movement produced by arms 73 and 156 and latch 81, but also is capable of longitudinal movement due to the sliding of bars 206 and 207.

Since the first operation of the latch consists in moving it to a predetermined transverse position and then moving it a predetermined distance longitudinally, this last movement, produced by the sliding of bars 206 and 207 will be described later.

Referring to Figs. 28, 29 and 33, bar 145 carries nine latches and is located directly over two plates 168 and 169, and each of the nine latches, as 144, is directly over one of the nine openings of the plates. The latch 144 which is slidingly mounted in a vertical slot of bar 145, is shown depressed (Fig. 29) with its lower end projecting down through the openings of two superimposed sliding plates 168 and 169. It is the function of these two plates to record the result of multiplication on the recording wheels of the machine. These plates and their equivalents form an important feature of my invention and they will be described in detail, although it will be understood that while I have shown and described a specific form of plate and a specific arrangement of openings, yet I do not desire to be understood as wishing to confine my improvement to the constructions illustrated, since various modifications in structure may be made in them without departing from the spirit of my invention.

Fig. 28 shows a top plan view of the two superimposed plates, and Figs. 30 and 32 are plan views of the plates separated. In Fig. 33, 170 and 171 are slotted guide rails secured to the frame of the machine. The general arrangement of these guide rails is also shown in plan in Fig. 26 and in transverse section in Fig. 2. In Fig. 26 the upper plates 168 are shown and in Fig. 27 the lower plates 169 are shown, the upper plates being removed. There are seven pairs of these sliding plates. Of each pair, the upper plate as 168, is designated the unit digit plate, and the lower plate of the same pair 169, is designated the tens digit plate.

Each plate has nine openings, the openings of the upper plate 168 being designated by reference numerals in Figs. 30, 172, 173, 174, 175, 176, 177, 178, 179, and 180, of which opening 172 is allotted to units and opening 180 is allotted to nines. At one end of plate 168 is a bracket 185, which is also shown in side elevation in Fig. 64. The upper end of bracket 185 is connected by a tension spring 184 with a horizontal ratchet arm 182 having ratchet teeth on its upper edge, engaging the under side of a ratchet wheel 183, this wheel being loosely mounted on shaft 186 supported in suitable bearings in frame members 187 and 252. The general arrangement of the shaft is shown in Figs. 5 and 43. The opposite end of plate 168 has a tension spring 309, one end of which is secured to member 202 of the frame, as shown in Fig. 26. The extent of movement of the plate by spring 309 is limited by a stop 203 fixed to frame member 204. Similarly, lower or tens digit plate 169 is provided with nine openings, as shown in Fig. 32, the openings being designated respectively by numerals 189, 190, 191, 192, 193, 194, 195, 196, 197. Of these openings, 189 is allotted to units and 197 to nines. A bracket 198 is secured to one end of plate 169, carrying at its upper end a pivoted ratchet arm 199 having teeth on its lower edge engaging the upper periphery of a ratchet wheel 200, loosely mounted on shaft 186. A tension spring 201 connects the bracket and the arm 199 to hold the arm in contact with the ratchet wheel. As shown in Fig. 27, a tension spring 181 connects the rear end of plate 169 with frame member 202.

It will be remembered that the seven pairs of plates are located beneath the seven bars of the latch guiding frame shown in Fig. 2, and that each latch of the frame may be pushed down to pass through the corresponding openings of the two plates. It has already been described how a latch as 144, may be depressed by the shoes of the multiplicand riders, and how it may be adjusted to various later positions by the shoes of the multiplier riders.

Referring to Fig. 28, it is seen that since latch 144 projects down through both plates 168 and 169, back-and-forth movement of the latch will produce back-and-forth movement of the plates and corresponding movement of the ratchet wheels, the manner and extent of these movements depending upon the lateral position of the latch in the openings 176 and 193 (Figs. 35 and 37) and upon the configuration of the front edges of the openings with which the latch contacts. Latch 144 has a constant distance of travel indicated in Figs. 34, 35 and 37 by reference numeral 205, this distance being the same as the distance of travel of the latch guiding frame.

Before proceeding with the detailed description of the construction of the plates, I will now show how the latch guiding frame is actuated back and forth through its distance of travel (205). Referring to Figs. 24 and 23, side bars 207 and 206 are pivotally connected at their ends by means of links 211 and 216 to bell crank levers 212 and 217. Lever 212 is pivotally mounted on the stationary frame member 213 carried by members 202 and 204, and lever 217 is pivoted to frame member 64 (see Fig. 23). To one end of lever 212 is pivoted a link 214 which is pivotally connected at its opposite end to a bar 215 slidably mounted in frame members 66 and 64. One end of L-lever 217 is connected by a link 218 to bar 215. The upper face of bar 215 carries a roller 219 by which bar 215 and the latch guiding frame are moved back and forth. To move roller 219 back and forth, it is received in a peripheral groove 220 of a cam 129, which is fixed to shaft 117, as shown in Figs. 24, 22 and 42. The rotation of the cam by means of lever 7 has already been described and it will be remembered that the cam makes four revolutions for one movement forward of lever 7. The developed surface of the cam is shown in Fig. 25 and it will be noted that during one-half the revolution of the cam, no movement is imparted to the latch guiding frame and that during the remaining one-half of the movement of the cam, the frame is moved forward and back. In Fig. 25 the first half of the revolution of the cam is represented by the distance 221 to 222, and the second half by the distance 222 to 223.

Referring to Figs. 34, 35 and 37, stop 144 when moved forward by the cam through its distance (205) will strike a stop 224 on plate 168 and will also strike a stop 225 on plate 169, moving plate 168 forward a distance indicated by numeral 226 and moving plate 169 a distance indicated by numeral 227.

The travel of 144 is divided into nine equal parts. Latch 144 moves through four parts of its travel before engaging stop 224, and during the remaining five parts of its travel it moves plate 168 a distance equal to five parts. Similarly, the latch traverses seven parts of its travel before engaging stop 225 of plate 169 and moves that plate two parts of its travel. Since the movement of plate 168 is through five parts of the travel of latch 144 and the movement of plate 169 is through two parts, it will be observed that the actual movement of plate 168, in ninths of the distance 205, corresponds to the unit figure of the product of 5×5=25, namely 5, and that the movement of plate 169 corresponds to the tens unit of the product, namely 2. It is for this reason that the upper plate 168 is termed the unit plate and the lower plate 169 is termed the tens plate.

To explain the arrangement of the stops in detail, reference will be had first to Fig. 35, where it will be noted that each of the openings 172 to 180 is divided into ten longitudinal strips or spaces indicated by the numerals 228 to 237. These stops are in alinement with the ten lateral positions that may be given to latch 144 by the latch setting mechanism previously described. Strip 228 corresponds to zero, and strip 237 corresponds to nine. Since there are nine openings in the plate and each opening has ten positions in which the stops, such as 144, may be located, there are ninety positions on the plate in which a stop may be located. In the first of the ten lateral positions, namely along strip 228, the opening is of such length that the latch may go through its full travel without moving either plate, thus leaving nine effective locations laterally, or eighty-one in all. Since there are only eighty-one different products obtainable by the multiplication of two digits, it is seen that each plate is provided with one stop for each product, there being eighty-one stops, nine stops to each of the nine openings.

It will be recalled that depressing multiplicand key five depresses latch 144. In like manner, depressing the unit key in the unit column of the keyboard will push down the latch in the first openings of the two plates, namely openings 172 and 189, and depressing a nine key will depress a latch in openings 180 and 197. For illustration, if the number 1 is chosen as the multiplicand, there are only nine possible figures in the product of that multiplicand by any digit, that is, the product must lie between the numbers 1 and 9. Therefore, in the first or unit opening 172 of the unit digit plate I provide nine stops, the first of which permits the latch to move through eight spaces before encountering a stop, then moving the plate 168 one space. Similarly the ninth position (on line 237) causes the latch to move the plate through nine spaces. There are no stops provided in the opening 189 of plate 169, so that no movement of the plate is produced when a latch in opening 189 is moved through its travel. In like manner, each of the openings of the plates is provided with stops so disposed that the travel of the latch will move the plate 168 as many spaces as correspond to the number of units in the product, while the stops of plate 169 are so arranged that the latch will move this plate as many spaces as there are units in the tens figure of the product. The location of the various stops in the several openings was obtained by tabulating all of the possible products within the range of 9×9 and locating the stops to suit. The method of locating the stops will now be explained. To each of the nine digits (1 to 9) one opening was allotted in consecutive order lengthwise the plates. In each opening stops were located in the ten cross-wise divisions. The stops are of such length as to correspond (in terms of one-ninth of the travel 205) to the ten products obtainable, when the digit allotted to the opening is multiplied successively by the digits from 0 to 9. The stop corresponding to the unit digit of the product is located on plate 168 which is called the unit digit plate, and the stop corresponding to the tens digit of the product is located on the plate 169 called the tens digit plate. The stops are preferably arranged so that the stops of the units digit of the products are in consecutive order crosswise the unit digit plate. The stops of the tens digit of the product are in consecutive order crosswise the tens digit plate. However, I do not desire to confine myself to such consecutive arrangement of the stops, but may arrange them in other than consecutive order if desired. In the example under consideration, 5×5=25, latch 144 is in the fifth opening from the right hand end of Figs. 35 and 37. It is also in the sixth crosswise position from the top. The length of the stop 224 in plate 168 is therefore five-ninths of the distance of 205, and stop 225 on plate 169 is two-ninths of the distance 205, as shown in Figs. 35 and 37.

I prefer in practice to construct the working face of the stops and the working edges of the latches as shown in the enlarged detail Fig. 36, where 259 is the pointed edge of stop 144 and 260 is the notched face of a stop as 224. The purpose of the pointed edge and the notch is to properly aline the latch 144 with the stop and to prevent its slipping sidewise.

While I have described the pushing down of the latch, the moving of it laterally and its travel forward as three separate and distinct movements, yet the first two of these movements occur simultaneously, while the third movement follows immediately after the completing of the first two movements.

Referring to Figs. 24, 25 and 54, latch 144 is depressed while the carriage moves from 130 to 135. During this time cam 129 has rotated from 221 to 222, producing no movement of the latch guiding frame, but during the next half revolution of the cam, namely from 222 to 223, the frame and latch 144 carried by it, are moved through the distance 205 (Fig. 34) and returned. During the rotation of the cam from 222 to 223 the carriage has traveled from 135 to 312 (Fig. 54). During this movement the flat horizontal face 134 of rider 36 has traveled along roller 138, holding the latch 144 down during this part of the travel of the carriage. Likewise the multiplier rider 81 (see Figs. 55 and 56) has during the same movement of the carriage, first depressed roller 150, thus rocking arms 73 and 156 to move the latch guiding frame transversely, and then during the second half of the rotation of the cam the lower horizontal face of rider 81 has held down roller 150, holding the latch guiding frame in its set position. Thus the latches are held in their vertical and transverse positions and moved longitudinally during the second half of the revolution of the cam. Since the cam makes four revolutions during the forward movement of lever 7, the latch guiding frame will be moved forward and back four times during the forward travel of the carriage. But no operation bearing on the multiplying process is produced by the last three of these movements of the latch guiding frame in the example in hand. In explanation, reference may be had to Fig. 54, where it will be seen that latch 144 is first depressed by rider 36 during the forward movement 130 to 135 of the carriage, then held down during movement 135 to 312, and released during movement from 312 to 313. The three succeeding latches are also depressed and released while the rider is traveling to the position 131 shown in dotted lines. Reference to Fig. 56, however, will show that the latch guiding frame was moved transversely to bring latch 144 into its fifth transverse position during the travel of the carriage from 130 to 135. The flat horizontal face of latch 81 held the frame in this position while the carriage traveled from 135 to 312, and released the frame while the carriage traveled from 312 to 313. Immediately after the face of rider 81 passed roller 150, arms 73 and 156, actuated by springs 310 and 311, return the latch guiding frame to its zero position, thus bringing all the latches, including 144, into position 228 of plate 168 (see Fig. 35). Referring now to Fig. 54, it will be seen that rider 36, while depressing the three subsequent latches, has no further effect upon the plates, since these latches are all in register with the first slots of their respective plates and fail to move these plates during the three subsequent reciprocations of the latch guiding frame.

Referring now to Fig. 28, the forward movement of plate 168 and ratchet arm 182 moves ratchet wheel 183 a distance corresponding to five teeth of the ratchet in the assumed example 5×5=25. Ratchet 183 preferably has twenty teeth.

Referring to Fig. 64, gear 239, fixed to ratchet 183, has forty teeth. Gear 240 is loosely mounted on shaft 241, which is supported by frame members 187 and 188. Gear 240 meshes with 239 and also with a second idle gear 242, which is loosely mounted on shaft 243, this shaft being supported on frame members 187 and 188. Gear 242 meshes with gear 244 which has twenty teeth. This gear is fixed to hub 245, which in turn is loosely mounted on shaft 246 (see enlarged detail Fig. 66). Shaft 246 is supported in suitable openings formed in the frame member 187 and in a bracket 247 carried by frame member 188. To hub 245 is also fixed a gear 248, which has twenty teeth, and meshes with a gear 249 which also has twenty teeth and is fixed to register wheel 250, this wheel being loosely mounted on shaft 251. This shaft is mounted in suitable openings in frame members 187 and 188. (See also Fig. 43.) The gear ratio is such that the movement of ratchet 183 through a distance of five teeth causes wheel 250 to turn five-tenths of a revolution. The rim of wheel 250 is divided into ten equal parts, numbered 0 to 9 consecutively, the zero being exposed when in normal position. The turning of the wheel five-tenths of a revolution exposes number 5.

Referring to Fig. 28, ratchet arm 199, which is fixed to plate 169, has been moved to turn ratchet wheel 200 through two teeth. Wheel 200 is fixed to gear 252 which turns gear 253 (see Fig. 63) gears 254, 255, 256, 257 and register wheel 258, the number wheel being turned two spaces and showing 2 at the tens place of the answer. Thus the product 25 is indicated on the registering wheels of the machine.

It will be observed from Fig. 29 that the units plate 168 turns the units wheel during the forward movement of the plate, whereas the tens plate 169 turns the tens registering wheel on the return movement of the plate, the ratchet arm 199 slipping over the ratchet wheel 200 during the forward movement of plate 169. The purpose of this arrangement will be explained later in connection with an example showing the operation of the machine when applied to a different problem— that is, the multiplying of two numbers, each having more than one digit.

*Fifth operation (returning lever 7 to its initial position).*—In Fig. 44 the return movement of lever 7 occurs in a direction opposite that indicated by the arrow. It rocks shaft 98, lowers arm 99, and by means of the pin 104, which engages the slotted opening 105 of pawl 106, partly rotates the pawl in a clock-wise direction before it turns gear 108. The first movement of the pawl 106 is to lift lever 261 as indicated by dotted lines in Fig. 45, depressing its opposite end. Lever 261 is secured (see Fig. 11) by means of a pivot 262 to frame member 64. To the opposite end of lever 261 is pivoted (see Fig. 45) a link 263 which is pivoted to the end of an arm 264 fixed to shaft 265. This shaft is rotatably mounted in the frame members 64, 266, 267 and 50, as shown in Fig. 13. It is also illustrated in detail in Fig. 47. Upon shaft 265 is fixed an arm 268, shown in detail in Fig. 52, where 269 is a slot formed in the end of arm 268, and 270 is a pivot engaging the slot, the pivot being mounted on release key 5. The downward movement of arm 268 depresses release key 5, the shank of this key being guided by and vertically slidable in frame member 266, and being spring-pressed upward by spring 271, attached at its upper end to the frame member 266. One of the effects of depressing key 5 is to rock shaft 53, by means of shoulder 272 and arm 273 fixed to the shaft, although no function is performed by this movement in the present example.

Referring to Fig. 47, depressing key 5, the lower end of which is provided with a lug 274, operates the following parts: Link 275, is pivoted at its upper end to the lug and at its lower end to an arm 276 fixed to a short shaft 277 which is revoluble in frame member 23. To the opposite end of shaft 277 is fixed an arm 278 connected by a movable bar 279 to an arm 280 which is pivoted to frame 23, as shown in Fig. 22. In Fig. 48 it will be seen that the rocking of arms 278 and 280 lifts bar 279, the upper face of which bears against and raises arm 281, which is fixed to shaft 282. This shaft is revolubly mounted on the carriage, as shown in Figs. 18 and 8. Referring to Fig. 8, the rocking of shaft 282 and arm 286 pushes bar 287 to the right. The opposite end of bar 287 is slidably received in an opening in end bar 38 of the carriage, as shown in Fig. 2. This movement of bar 287 to the right releases rider 36 by the following means. A notch 288 is formed in the lower edge of bar 287 (Fig. 8.) When the edge of this notch strikes the projection 289 (Fig. 6) of latch 42, it releases the heel 43 of the latch from the notch 44 of rider 36, allowing the rider to be returned to its initial position by spring 41. Similarly, rider 81 is released by the rocking of shaft 282. For clearness in illustration, the connections between shaft 282 and rider 81 are omitted from the drawings, they being similar to those just described for latch 36. Referring now to Fig. 47, at the right hand end of shaft 265 is an arm 290 fixed to the shaft. This arm is also shown in Fig. 49. When shaft 265 is rocked, arm 290 is moved down to the position shown in dotted lines, wiping over the projection 291 on latch 83, and pushing the latch to the left, as shown by dotted lines and allowing it to be returned by spring 84. It will be remembered that projection 82 on key 3 was previously depressed to the position 87 shown in dotted lines in Fig. 49. The back-and-forth movement of latch 83 just described releases toe 85 from notch 86 of projection 82 and allows key 3 to rise from position 87 to position 292 indicated in Fig. 49.

Projection 82 is prevented from rising to its original position by reason of the fact that when it reaches position 292 it is engaged by latch 88, this latch having been pushed to the right by arm 295, as shown by dotted lines in Fig. 50. Arm 295 is shown in Figs. 47 and 51. It projects through an opening in frame member 23 and drops into an opening 294 formed in the side of member 127 of the sliding carriage, when this opening passes in front of 295. At other times the end of 295 slides along the outer face of 127. Arm 295 enters opening 294 when the carriage is in its initial position, and at no other time, so that key 82 is released and allowed to return to its initial position only when the carriage is in its initial position. When the carriage begins to move forward, arm 295 is automatically forced out of opening 294, one edge of the opening being beveled for that purpose, as shown in the detail horizontal section, Fig. 51.

The purpose of latch 88 will now be explained.

Referring to Figs. 39 and 41, it will be recalled that depressing key 3 shifted cross-key 67 from the hub 296 to hub 114 for purposes previously explained. It is the function of latch 88 to hold cross-key 67 in hub 114 until the carriage has completed its travel and returned to its initial position. The return of the carriage to its original position is accomplished by the same mechanism as has been described for the forward movement of the carriage, but in the reverse direction. When key 3 returns to its raised position, it also restores L-levers 28 and 34 (Figs. 6 and 8) to their original positions, the same mechanism being utilized for returning the levers that has been described as shifting them. Thus all of the multiplier riders are thrown out of alinement with the key-board and the multiplicand riders are thrown into alinement. The return of key 3 also draws the latch guiding frame one space to the left in Fig. 39, for a purpose which will be described in discussing the example of addition, the mechanism for producing this movement being the L-lever 57, the link 68, and the arm 69. This arm is loosely mounted on shaft 70. A lug 71 is formed on arm 69 and is adapted to engage a corresponding lug 72 on arm 73 when key 3 is raised. The dotted lines show the position of the arms when key 3 is depressed, the full lines showing the arms and the end bar 147 of the latch guiding frame in the position they occupy when key 3 is raised.

*Sixth operation (re-set the registering wheels).*—By the means above described, the entire mechanism of the machine has been restored to its original position with the exception of the registering wheels. The means by which these wheels are returned to their zero position will now be described.

Key 6, as shown in Figs. 44 and 77, is pivoted at its lower end to a segmental gear 298 loosely mounted on a pivot 299 fixed to the frame 64. Key 6 is guided at its upper end by a suitable slot in the top of case 1. Segmental gear 298 rocks on its pivot 299. On the side of segmental gear 298 is a projecting pin 301 slidable in a slot 300 of a link, the construction and purpose of which will be described further. Gear 298 does not move the link. When key 6 is depressed, gear 298 turns pinion 302 one revolution. This pinion is fixed to a shaft 303 carried by the frame of the machine. This shaft is also shown in Figs. 4 and 12.

Referring to the detail views Figs. 64 and 65, shaft 303 has a gear 304 fixed to it, meshing with a gear 305 which is fixed to wheel 250. Shaft 303 also carries a fixed gear 306 meshing with gear 307 fixed to wheel 258.

In further explanation of the operation of gears 304 and 305, reference may be had to Figs. 73, 74 and 75, where it will be seen that each of the gears 304 and 305 has places for ten teeth, but that one tooth is omitted, the teeth of the two gears being so placed that when gear 305 is in the position shown in Fig. 74 (in which position zero is shown on wheel 250) it cannot be turned by gear 304, but when 305 is turned to expose any other number except zero on 250, one of the teeth on gear 305 will be brought to position on a line joining the two shafts (see Fig. 74). Gear 304 then turning through one revolution will rotate gear 305 until the place of the missing tooth returns to the position shown in Fig. 74, at which zero is shown on 250. Wheel 250 is turned during this operation in the same direction in which it was turned by ratchet arm 182, namely clock-wise in Fig. 74. This turning of wheel 250 turns gears 249, 248, 244, 240, 239, and ratchet wheel 183 (Fig. 63) causing the ratchet wheel to slip on ratchet arm 182. When the gears are in the position shown in Fig. 74, gear 305 may be rotated without affecting gear 304. In the same manner as above, wheel 258 is returned by gears 306 and 307.

It may be remarked at this point that there is provided an additional device for carrying the tens digit from the unit to the tens wheel, but the details of this device and its operation will be explained in considering the next example which will be that of addition. Key 6 is returned to its raised position by tension spring 318, the upper end of which is secured to frame member 64 (see Fig. 44).

*Simple addition.*

To illustrate the function and mode of operation of the machine in the process of adding, I will now trace through the machine the movements of the various parts involved in a simple addition, for illustration 5+5=10. In performing this example, the operator proceeds as follows:

First: Depress the key corresponding to the first number to be added.

Second: Draw lever 7 forward and return it.

Third: Depress the key of the second number to be added.

Fourth: Draw lever 7 forward and return it.

Fifth: Reset the registering wheels.

*First four operations.*—Key five when depressed, sets the rider 36 the same as it was set in the example of multiplication.

It will be remembered that in the previous example, the forward movement of lever 7 caused shaft 61 (Fig. 17) to revolve four times, which moved the carriage its full travel and moved the latch-guiding frame forward and back four times. In the present instance, however, it is only desired to turn shaft 61 one revolution and to move the carriage one-fourth of its travel and return, and to move the latch-guiding frame forward and back once. This is accomplished by means of the gears shown in Figs. 17 and 44, these gears being interposed between lever 7 and its shaft 61. Cross-key 67 being normally in engagement with hub 296 of gear 297 does not require to be shifted as in the previous example. The first part of the forward movement of lever 7 releases the key-board as in the previous example. Continued movement of lever 7 turns gear 108, pinion 109, shaft 110, gear 321, which is fixed to shaft 110, gear 297 and shaft 61. Shaft 61 operates the carriage and the latch guiding frame in the same manner as previously described.

Before discussing the mechanism in detail, reference may be had to Figs. 35 and 39, where it is seen that when key 3 is up, latch 144 is in the position shown in full lines in Fig. 39, corresponding to position 229 of Fig. 35, or the units position, it being remembered that the first position 228 is the zero position and that position 229 is the normal location of the latches with reference to plates 168 and 169.

Referring now to Figs. 53, 24 and 25. During the first half turn, 221 to 222, of cam 129, shaft 117 and its connections moves the carriage the distance 130 to 135 (Fig. 54). During this movement of the carriage from 130 to 135, rider 36 depresses latch 144. During the second half turn, 222 to 223, the cam 129 moves the latch guiding frame (Fig. 24) forward and back. This moves latch 144 forward and back through its distance 205, the latch meanwhile being held down by the flat face 134 of rider 36. This movement of the latch moves plate 168 five spaces, or the distance 226 shown in Fig. 35, but does not engage any stop on plate 169 as is evident from inspection of Fig. 37. The movement of plate 168 brings the number five to view on the units recording wheel 250. The return of lever 7 releases rider 36 and returns the carriage to its original position. Depressing second number five turns wheel 250 in the same manner five more spaces, but since there are only ten spaces on the wheel, zero is brought to view on the unit wheel.

To carry forward the tens figure representing the sum of the units 5+5, the following mechanism is employed: Referring to Figs. 63, 65, 68, 69 and 70, when wheel 250 turns, hub 245 on shaft 246 also turns. This hub has a gear 322 fixed to it and this gear meshes with a larger gear 323 loosely mounted on shaft 251. The ratio of gears 322 to 323 is as 1 to 2. Gear 323 has a hub 324. Formed integral with the hub 324 are two cams 325 and 326. The direction of rotation of gear 323 and the cams 325 and 326 is as shown in the arrow in Fig. 68. Pivotally mounted on shaft 241 is a pair of L-shaped arms 327 and 328. The upper end of arm 327 has a lateral projection 329 and arm 328 carries a similar projection 330 adapted to engage the peripheral faces of the respective cams. To arms 327 and 328 are pivoted pawls 331 and 332 respectively, the pawls having springs 333 and 334 secured to the frame of the machine in any suitable manner.

During the first half revolution of cam 325 in the direction of the arrow, Fig. 68, arm 327 is not moved, but during the second half of the revolution of the cam the upper end of arm 327 is first pushed to the right and then allowed to snap back. Similarly, arm 328 is alternately pushed to the right and allowed to snap back during the first half of the revolution of cam 326 and is not actuated during the second half of the revolution of the cam. Since gear 323 and the cams have been turned through one-half revolution in the example under discussion, it is apparent that arm 328 is moved to the right and allowed to snap back. This movement of arm 328 causes pawl 332 to engage one notch of a ratchet wheel 335 which is loosely mounted on shaft 246. (See Fig. 70). This ratchet wheel has ten teeth so that it is turned one-tenth of a revolution. Fixed to ratchet wheel 335 is a hub 336, upon which gear 256 is fixed. Since gear 256 meshes with gear 257 which is fixed to number wheel 258 (see Fig. 63), the number wheel is turned one-tenth of a revolution, bringing number 1 to view in the register wheel opening. In Fig. 68 it will be seen that arm 327 has a horizontal projection coöperating with certain parts which will be explained in a later example. It will also be seen that pawl 331 has a horizontally projecting member, the function of which will be described later in the present example. In the same manner as before, the return movement of lever 7 restores all the mechanism of the machine except the registering wheels, to its original position.

*Fifth operation (resetting the registering wheels).*—In the description of the operation of restoring the registering wheels to their zero positions, it was observed that the wheels travel in the same direction when being restored as when they are recording. In the precent example, in which the number 10 shows on the registering wheels, the clearing of the wheels by turning the tens wheel in the same direction as when it recorded, would result in recording the number 1 on the hundreds wheel in the same way that the number 1 was recorded on the tens wheel in the present example. It becomes necessary, therefore, to provide means to prevent this carrying forward when the wheels are being cleared.

The mechanism by which I accomplish this result will now be described. It will be recalled that when wheel resetting key 6 is depressed, shaft 303 is turned one revolution. The horizontally projecting end of pawl 331 is located beneath shaft 303 (see Fig. 75) and fixed to the shaft and adapted to engage the projecting member of the pawl is a sector-shaped cam 337. When the flat face of the cam is down it has no effect on pawl 331, but when the circular rim of the cam engages the horizontal projection of pawl 331, the pawl is thrown out of contact with ratchet wheel 335 by which the carrying forward of the number on the next succeeding register wheel is accomplished, as has been previously described. Shaft 303 (see Fig. 73) is geared to the register wheel 250 and before the register wheel can be turned sufficiently to change a number at the opening, cam 337 will have thrown pawl 331 out of engagement with the ratchet wheel so that no movement of the next succeeding register wheel will take place. It will be recalled that shaft 303 does not move except when wheel-resetting key 6 is depressed, so that cam 337 does not interfere with the operation of latch 331 except when the wheel-resetting key 6 is depressed.

Referring to Fig. 74, it will be apparent that if gears 304 and 305 happened to turn so that the ends of their teeth met, the gears would be locked, and also if number wheel 250 were turned slightly beyond its proper position, the number might not be fully shown at the opening. I, therefore, provide a detent spring 338 (Fig. 76) to engage the teeth of gear 249 to hold it in its proper position, the end of the spring being V-shaped to properly center gear 249 and also to center gear 305, since gears 249, wheel 250 and gear 305 are integral. Spring 338 is fixed to frame member 339 (see Fig. 5).

*Third example.*—To illustrate the function and mode of operation of the machine in the process of multiplying together two numbers of more than one figure each, which operation brings into play some features of the machine that have not already been described, I will now proceed to describe the movements of the various parts involved in such a multiplication, for illustration 123×456=56088. In performing this example the operator proceeds as follows:

First: Depress the keys of the multiplicand 123.

Second: Depress shift key 3.

Third: Depress the keys of the multiplier 456.

Fourth: Draw lever 7 forward and return it.

Fifth: Reset the registering wheels.

*First, second and third operations.*—The keys of the key-board corresponding to the multiplicand 123 are first depressed, thereby setting riders 340, 341, 342 of the multiplicand set (see Fig. 18) that correspond respectively to the numbers 1, 20 and 300. The keys depressed are locked down while the remaining eight keys in each row are locked in their up positions, as before. Shift key 3 is next depressed, releasing the keys of the key-board and throwing the keyboard into communication with the multiplier set of riders. The numbers of the multiplier 456 are then depressed, to depress riders 343, 344 and 345 of the multiplier set, corresponding to the numbers 4, 50 and 600.

*Fourth operation (drawing lever 7 forward and returning it).*—In the present example, the drawing forward and returning of lever 7 brings into action some parts of the machine which have not, up to this time, been described, the principal purpose of this illustration being to show how the carriage acts upon more than one set of plates simultaneously. The first part of the forward travel of lever 7 releases the keys of the key-board and allows them to return to their original position in the same manner as has been described in the example 5×5=25. In the present example, as in example 5×5 the carriage moves through its full travel, and the latch-guiding frame is moved forward and back four times.

Since the actual combining of the multiplicand multiplier to arrive at the product is mechanically done by the forward and backward movement of the carriage and the shuttle-like back and forth movement of the latch guiding frame, I will now analyze these movements, it being remembered that the movements are produced by the drawing forward and returning of the lever 7. Reference will be had to Figs. 57 to 62 inclusive, where Figs. 57, 58 and 59 are diagrammatic views showing in full lines the relative positions of riders 340, 341 and 342 when they are depressed, as has just been described, and showing by dotted lines the final position of the riders after lever 7 has been drawn forward. The relative positions of the three stops mentioned are shown in plan in Fig. 17. These three stops are the multiplicand stops that were depressed at the first operation of the machine.

Figs. 60, 61 and 62 are similar views to indicate the relative positions of the depressed multiplier riders 343, 344 and 345. The relative positions of these stops are also shown in Fig. 17. During the first eighth of the travel of the carriage, that is from 130 to 135, rider 340 depresses latch 346, rider 341 depresses latch 347 and releases latch 348 (which was depressed when rider 341 was depressed, but which is released while latch 347 is being depressed). Rider 342 in traveling from 130 to 135 depresses latch 349 and releases latch 350, which was depressed when rider 342 was pushed down. Since latches 348 and 350 are released as soon as the carriage commences its forward movement, they have no effect in the present operation.

The multiplier riders shown in Figs. 60, 61 and 62, being mounted on the carriage, move forward simultaneously with the multiplicand riders, but during the first eighth of travel of the carriage, that is from 130 to 135, only one of the three depressed riders, namely 343, has any effect. Rider 343 in moving from 130 to 135 moves arm 73 and pushes the latch guiding frame to the right. Since rider 343 was depressed by the six key on the key-board, it follows from the previous description of the mechanism that the latch-guiding frame and all of its latches will be moved laterally to come into alinement with the stops in strip 234 of Fig. 35, this corresponding to the sixth position of the latch, or the seventh strip of the plate. During the second eighth of the forward movement of the carriage, that is from 135 to 312, the depressed latches will be held down by the flat horizontal faces of the rider shoes and the latch-guiding frame will be held in the position just described, with the latches in the strips 234 of the plates.

Referring to Fig. 23, latches 346, 347 and 349 are depressed and it is seen that 346 is the third latch on bar 145 and consequently it will engage the third opening (174 and 191) of plates 168 and 169. This is apparent when it is remembered that latch 346 was depressed by rider 340 which was depressed when the multiplicand digit three was impressed on the key board. In Figs. 26 and 27, latch 347 will similarly engage the second opening of plates 351 and 352 while latch 349 will engage the first opening of plates 353 and 354. Since the operation of each of the three latches is different, they will be described in order, beginning with latch 346 which corresponds to the figure three on the key-board.

I have shown that latch 346 is in the third opening of the plates and in the sixth position laterally and I have previously shown that the action of the plates should register the product of two numbers, one number being allotted to the opening and one number to the position laterally of the latch. The product would be, therefore, 18.

Inspection of Fig. 35 shows that units plate 168 will be moved by the latch eight spaces, while the tens plate 169 will be moved one space, thus registering 8 on the units wheel and one the tens wheel.

Reference may be had to Figs. 26 and 27.

In the following discussion, more than three pairs of plates, namely, 168 and 169, are moved. The wheels actuated by all of the plates will, therefore, be noted. Plate 168 registers on the unit registering wheel. Plates 169 and 351 register on the tens wheel. Plates 352 and 353 register on the hundreds wheel. Plates 354 and 355 register on the thousands wheel. Plates 356 and 357 register on the ten thousands wheel. Plates 358 and 359 register on the hundreds of thousands wheel and plates 360 and 361 register on the millions wheel. 362 registers on the tens of millions wheel. Latch 347 is in the second opening of the tens pair of plates 351 and 352 and in the sixth position laterally in those plates, hence the number recorded by the plates of this latch should be 12. The stops are, therefore, so located that 2 will be registered on the tens wheel by plate 351 and 1 on the hundreds wheel, by plate 352. Similarly latch 349, which is in the first opening of plates 353 and 354 and in the sixth lateral position of those plates, moves plate 353, to register 6 on the hundreds wheel.

Summing up the digits thus registered it will be found that the product of 6×123 equals 738, is registered on the wheels by the first of the four forward and back movements of the latch-guiding frame.

During the third eighth of the travel of the carriage, that is from 312 to 313 in Fig. 57, rider 340 releases latch 346 and depresses latch 363, while rider 341 releases latch 347 and depresses latch 364 and rider 342 releases latch 349 and depresses 365.

Referring to Figs. 60 and 61, it will be seen that rider 343 has released the latch-guiding frame and has allowed the latch guiding frame to begin its return movement under the action of springs 310 and 311, Fig. 22, but before it has completed its return movement the bevel face of rider 344 has engaged the roller it alines with and has rocked shaft 70 so as to move arm 73 and the latch-guiding frame to the right a distance corresponding to the thickness of the shoe of latch 344, which in this case brings all of the latches into the position 233, Fig. 35. Since latch 344 was depressed by the fifty key of the key-board, the latch occupies the fifth transverse position of the plates, namely, 233.

Latches 363, 364 and 365, Figs. 57 to 61, all now occupy the fifth transverse position of their respective plates. During the next succeeding half turn of the cam corresponding to movement (313 to 314) of the carriage, the flat faces of the rider shoes hold the three latches down and in the fifth lateral position while the latch-guiding frame makes its second forward and back movement.

Referring to Fig. 23, it will be seen that latch 363 is the third latch on bar 162 and since it occupies the fifth lateral position, the plates engaged by it should register the product of 3×5, or 15. These plates are numbers 351 and 352. Plate 251 registers 5 on the tens wheel and plate 352 registers 1 on the hundreds wheel. Similarly latch 364 should register 2×5 or 10 by means of plates 353 and 354. Therefore, plate 353 does not move and plate 354 registers 1 on the thousands wheel. Latch 365 occupies the first opening and fifth position of plates 355 and 356 and should register 1×5, or 5. This latch moves plate 355 five spaces and does not move plate 356. The sum of the digits added in on the second forward and return movement of the latch guiding frame equals 50×123 or 6150. This number added to the number already registered during the first reciprocation of the latch-guiding frame, namely, 738, makes a total of 6888, showing on the registering wheels at the end of the second reciprocation of the latch guiding frame. While the carriage is moving through the fifth eighth of its travel, or 314 to 315, Figs. 57 to 59, multiplicand rider 340 depresses latch 366 and releases 363. Rider 341 depresses latch 367 and releases latch 364 while rider 342 depresses latch 368 and releases latch 365. Referring now to Figs. 61 and 62, the travel of the carriage from 314 to 315 causes rider 344 to release the latch-guiding frame and permits it to move backward until the bevel face of rider 345 comes into engagement with the roller alined with it and thereby rocks shaft 70 and moves the latch-guiding frame and the latches carried by it into alinement with the fourth transverse position, i. e. 232, of the plates (see Figs. 35 and 36). It will be recalled that rider 345 was depressed by the four hundred key of the key-board, thus corresponding to the fourth lateral position of the latches in their openings.

In Fig. 23 latch 366 is the third latch on bar 163. It, therefore, enters the third opening of plates 353 and 354 and being in the fourth lateral position it should record 3×4 or 12 on the wheels. Plate 353, therefore, registers 2 on the hundreds wheel and 354 registers 1 on the thousands wheel. Similarly latch 367 is in the second opening of plates 355 and 356 and in the fourth position laterally and therefore registers 8. Plate 355 registers 8 on the thousands wheel and plate 356 does not move. Stop 368 is in the first opening of plates 357 and 358 and in the fourth lateral position and should register 4. Plate 357 records 4 on the ten thousands wheel. Plate 358 is not moved. On the third back-and-forth movement of the latch-guiding frame, the digits added are equal to 400×123 or 49200. This number added to the sum of the products already obtained, 6888, equals 56088, which is the product of 123×456. During the seventh one-eighth of the travel of the carriage, Figs. 57 to 59, that is from 316 to 317, latches 367 and 368 are released and latches 369, 370 and 371 are depressed and are held down during the final eighth of travel of the carriage from 317 to 131. Reference to Fig. 62 will show that during the travel of the carriage from 316 to 317, the rear beveled face of rider 345 allowed the latch-guiding frame to return to its zero position, thus bringing the latch-guiding frame and all of the latches in alinement with strip 228, see Fig. 35, which corresponds to the zero or inoperative position of the latches and plates. During the fourth reciprocation back and forth of the latch-guiding frame, latches 369, 370 and 371 do not produce any movement of the plates and consequently do not register on the wheels.

Referring to Figs. 28 and 29, it will be recalled that the tens digit plate of the unit pair of plates, namely 169, engages the upper periphery of ratchet wheel 200.

I have described the action of the plates on the registering wheels as occurring during the forward and back movement of the plates, but since the tens plate and the units plate are actuated by the same latch, they will move forward and return simultaneously and would actuate the tens wheel and the units wheel simultaneously were it not for the arrangement shown in Figs. 88 and 89, where it will be seen that the units plate registers on the forward movement and the tens plate registers on the backward movement. The lower plate of one pair has its ratchet arm engaging the upper periphery of a ratchet wheel, as 200, while the upper plate of the next adjacent pair has its ratchet arm in engagement with the lower periphery of the same ratchet wheel. The detail of this connection is shown in Figs. 88 and 89, in which 372 is the ratchet arm of plate 351.

Referring to Figs. 63, 64 and 70, ratchet 335 is loose on shaft 246, but its hub 336 is integral with gear 255. This gear is driven by gear 252 to which ratchet wheel 200 is fixed so that when ratchet wheel 200 turns, ratchet wheel 335 will also turn. Since under certain conditions recording wheels 250 and 258 may turn simultaneously, and since wheel 250 may attempt to register or carry forward on wheel 258 while this latter wheel is in motion, it is desirable to provide means by which this carrying forward will be delayed until after the wheel 258 has come to rest. It is necessary, therefore, to provide means in connection with ratchet wheel 335 (Fig. 68) that will prevent pawl 331 from attempting to turn the ratchet wheel while the latter is in motion, in other words, that will prevent the carrying forward of a number to the next higher wheel while that wheel is already in motion. For this purpose I provide horizontal projections 373 and 374 on arms 327 and 328, each projection adapted to be received in a notch formed in the edge of one of the spring-pressed L-levers 375 and 376, shown in Figs. 68, 71 and 72, the lower ends of the L-levers being adapted to be engaged by a horizontal bar 377 fixed to supporting bars 206 and 207 that are reciprocated by the cam 129 (Fig. 24).

Referring now to Figs. 68 and 72, when bar 377 is in its normal position it engages levers 375 and 376 and holds them out of contact with projections 373 and 374 of L-shaped arms 327 and 328, and when it reaches the opposite extremity of its travel bar 377 throws the parts out of contact in the same manner, through the medium of a pair of L-levers 378 and 379 and links 380 and 381, as shown in Figs. 68 and 71. As soon as bar 377 has commenced its travel in either direction, it allows the L-levers 375 and 376 to rest against the projections 373 and 374. When the cams 325 or 326 are turned, one of the cams as 325 pushes the upper end of its L-lever as 327 to the right, causing the projection 373 to be lowered so as to register with the notch of lever 375, thus preventing the return of arm 327 until disengaged by bar 377. It is only when bar 377 is at one extremity or the other of its travel that the projection is released, permitting the pawl 331 to operate on 335.

It has already been described how the ratchet wheel 335 carries forward numbers from one recording wheel to the next and how this wheel is actuated by the latch-guiding frame in its travel forward and back. It is evident that the only time that the ratchet 335 can be in motion is while the latch-guiding frame is being moved forward and back. Since the movement of the latch-guiding frame occurs only between its extreme points of travel, it follows that when pinion 335 is in motion, L-levers 375 and 378 are out of contact with bar 377, thus preventing wheel 335 from being turned by the pawl 331 until the ratchet wheel 335 has come to rest. Thus ratchet wheel 335 may serve its usual purpose in carrying numbers forward, but can not be interfered with during that operation by the action of pawl 331.

*Fifth operation.*—The result of depressing wheel-resetting key 6 to restore the registering wheels to their zero position is the same as in the previous example.

*Example of continued multiplication.*—To further illustrate the function and mode of operation of the machine in the process of multiplying I will now trace through the machine the movements of the various parts involved in a continued multiplication, for illustration 5×5×5=125. This example will bring into play certain devices which have not previously been described. In performing this example the operator proceeds as follows:

First: Depress multiplicand key five on the key-board 2.

Second: Depress shift key 3.

Third: Depress multiplier key five on the key-board 2.

Fourth: Draw lever 7 forward and return it.

Fifth: Depress shift key 4.

Sixth: Depress second multiplier five on the key-board 2.

Seventh: Draw lever 7 forward and return it.

Eighth: Depress wheel resetting key 6 to restore the registering wheels to their zero position.

The first four of the above operations are the same as has been described for the first five operations of the example 5×5=25, leaving the product 25 exposed on the registering wheels.

To continue the multiplication by the third product I will now trace through the machine the fifth operation, namely depressing shift key 4. Shift key 4 performs three functions, the first of which is to depress multiplicand riders corresponding to the numbers of the product that already stand on the wheels of the machine. The second function of shift key 4 which takes place during the second half of its downward movement, is to depress shift key 3 and to return the registering wheels to zero.

To describe the mechanism by which key 4 depresses the riders corresponding to the numbers shown on the registering wheels, I will refer to Figs. 80 to 86 inclusive and will begin at the registering wheel.

It will be understood that in the example under discussion, the numeral 5 shows on the units wheel 250, but for purpose of description I will follow the action of the parts, assuming that zero shows on the wheel as indicated in Fig. 80. To one side of wheel 250 is fixed a gear 382, which is loose on shaft 251. Gear 382 meshes with a gear 383 which is loose on shaft 303 and meshing with 383 is a pinion 384 which has a hub 385, one end of which is revolubly mounted in frame member 25, the opposite end of hub 385 being revolubly mounted in a bracket 386 which is carried by frame member 25. The ratio of gear 382 and pinion 384 is 1 to 1. Slidably received in the rectangular bore of hub 385 is a shaft 387, the end of which is squared for that purpose, as at 401, Fig. 82. The opposite end of shaft 387 is loosely received in an opening in frame member 23. The general arrangement of shaft 387 and the stops is shown in Fig. 12. The mounting of this end of shaft 387 is shown in detail in Fig. 78. A collar 388 is secured to shaft 387 by means of a set screw 389, the end of which is received in a turned groove 390 of the shaft 387, so that the shaft may turn in the collar, but can not move lengthwise with relation to the collar, as shown in Fig. 79.

Spaced apart on shaft 387 and fixed to it are nine radially disposed stops (see Figs. 80 and 81) these stops being designated by numerals 391, 392, 393, 394, 395, 396, 397, 398, 399. Each of these stops is spaced angularly with reference to the next succeeding stop one-tenth of the circumference as indicated by dotted lines in Fig. 85, which is an enlarged sectional end view of shaft 387, as shown in Fig. 85. Since there are nine stops, there is one space without a stop. Adjacent each stop is an L-lever as 13, the vertical leg of which has a lateral projection 400. When shaft 387 is in its normal position the projection 400 is alined with that part of the circle in which there is no stop, as indicated in Fig. 85. When zero shows on wheel 250, the projections on the L-levers are alined as shown in Fig. 85, in which position none of the stops are alined with the lateral projections of the L-levers. Turning wheel 250 to expose any other number will, therefore, turn the shaft and bring one of the stops into alinement with the projection of one of the L-levers. Thus if wheel 250 is turned to expose numeral 5, stop 395 will be alined with projection 400. When in this position longitudinal sliding of shaft 387 will cause stop 395 to engage the projection 400 and depress key 9 by rocking L-lever 13 as shown by dotted lines in Fig. 84. Therefore when any number as 5 is brought to view on wheel 250 and shaft 387 is moved endwise, the shank 9, which is the shank of key 5 of the unit column, will be depressed. The endwise movement of the shaft is accomplished during the first half of the movement of shift key 4 when it is depressed. Referring to Figs. 77 and 78, 267 is the frame member upon which key 4 is slidingly mounted, the key being drawn upwardly by a tension spring 402. The general arrangement of the key and its support is shown in Fig. 12. Referring again to Figs. 77 and 78, during the first half of the downward movement of key 4, projection 403 presses back arm 404 which is fixed to a shaft 405 carried by suitable bearings in frame member 23. A pair of upright arms 406 and 407 are fixed to shaft 405 and are connected by links 408 and 409 to a bar 410. This bar extends cross-wise the machine and carries the collars 388 (Fig. 12), which have already been described. Thus depressing key 4 draws all four shafts lengthwise simultaneously.

I have shown that when the numeral 5 shows on wheel 250 the five key of the unit column was depressed when shift key 4 was depressed. Similarly when 2 shows on the tens wheel 258 the second key of the tens columns is depressed, so that depressing shift key 4 simultaneously draws down key two of the tens column and key five of the unit column. This action depresses the multiplicand riders corresponding to those keys so that the number 25 is set as the multiplicand in the machine. This is all accomplished during the first half of the downward movement of key 4. During the second half shift key 3 is drawn down and all of the registering wheels are reset to zero. The mechanism by which this is accomplished is shown in perspective in Fig. 77 and its general arrangement is shown in Fig. 12. Upon the side of key 4 is a lug 411 and during the second half of the downward movement of key 4 this lug contacts with an arm 412 fixed to a shaft 413 that is revolubly mounted in frame members 50, 266, 267 and 64. A second arm 414 is fixed to shaft 413 and when lug 411 rocks shaft 413, arm 414 engages the upper face of a lug 415 on key 3 to depress key 3. When key 4 is released, it returns to its raised position.

The operation of shift key 3 is the same as has been described in the example 5×5, that is, it releases the key-board and shifts the upper movable frame to bring the multiplier set of riders into register with the key-board and shifts cross-key 67 into engagement with hub 114 (Fig. 41). It also releases the latch-guiding frame and allows it to return to its zero position.

Referring to Fig. 77, an arm 416 is fixed to the shaft 413. To the lower end of this arm is pivoted a link 417 in the end of which is a slot-receiving pin 301 of segmental gear 298, so that when shaft 413 is rocked, the segmental gear is rocked, thus turning pinion 302 and shaft 303 and thereby restoring the registering wheels to their zero position.

In Fig. 78, fixed to the side of key 4 is a projection 427 adapted to engage an arm 428 fixed to shaft 53. The downward movement of key 4 causes shaft 53 to be rocked to no purpose, but upon its return it releases the keys that have been depressed during the first half travel of key 4. Multiplier key 5 is next depressed, thus setting the corresponding multiplier rider. Lever 7 is next drawn forward, thus registering the number 125 on the wheels. Lever 7 is then returned, thereby restoring all of the mechanism, except the registering wheels, to its initial position. The registering wheels are then cleared as before by depressing shift key 6. Up to this point, I have described the action within the machine of shift key 5, but have not shown why it is shown on the key-board. If the wrong number is impressed on the key-board by mistake, the operator, by depressing key 5 may release all of the set mechanism without affecting the wheels.

In Figs. 47 and 52, key 5 was depressed by the return movement of lever 7 and thereby released the riders on the carriage. It also rocked shaft 265 and released latch 83 from shift key 3. It also rocked shaft 53, thereby releasing all the keys of the keyboard.

I will now explain how two numbers which give a product less than 10, as for instance 3×3, may be multiplied. Referring to Fig. 1 the multiplicand is put into the machine by depressing the key bearing numeral 3 of the unit column, the operation being to depress the corresponding multiplicand rider on the movable carriage, as has already been explained in the discussion of previous examples. Shift key 3 is then depressed. The multiplier is then entered by again depressing key 3 of the unit column. This operation sets the corresponding multiplier rider on the movable carriage. The lever 7 is then pulled forward, thereby shifting the carriage, whereupon the multiplicand rider depresses latch 346 (see Fig. 23) and the multiplier rider moves the latch-guiding frame, of which bar 145 is a member (Figs. 23 and 28) to the third lateral position 231 of Fig. 35, as has been previously described. Referring now to Figs. 35 and 37, it is seen that latch 346 will be thrust into the opening 174 of plate 168 and opening 191 of plate 169 and will be positioned in this third lateral position, viz. 231. Plate 168 will be moved during the first forward-and-back reciprocation of the latch-guiding frame nine spaces, and plate 169 will remain stationary. The movement of plate 168 causes the register wheel 250 of the units column to expose figure 9, which is the required product. It will be noted that the positioning of the latch 346 took place during the travel of the carriage from position 130 to position 135 of Fig. 15, and that the actuating of the register wheel to expose the product occurred during the travel of the carriage from position 135 to position 132, the movement being produced by the forward-and-back movement of the latch-guiding frame which is actuated by cam 129. During the travel of the carriage from position 312 to 313 and thence to 131, the register wheels were not turned, because although the multiplicand rider depressed successively the three latches 363, 366 and 369 (Fig. 23), during the travel of the carriage from position 312 to 331, yet the latch-guiding frame, being in its zero position (because no multiplier riders are prepared to position it during this part of its travel) that all latches were in position 228 of the following three pairs of plates: 351 and 352, 353 and 354, 355 and 356. There being no stops in position 228, the plates were not moved and did not actuate their register wheels.

At the beginning of this specification, six functions were mentioned as capable of being performed by the machine. Of these six functions I have described (A) straight multiplication, A×B=R, (B) straight addition, A+B=R, and (C) continued multiplication, A×B×C=R. Of the remaining three functions, (D), which is addition applied with multiplication, as A+B+C+(A×C)=R, is seen to be merely a combination of functions (B) and (A), the only variation being that after function (B) has been performed, the registering wheels are not re-set before performing function (A); function (E) is a combination of functions (C) and (A) without resetting the registering wheels; function (F) is a combination of functions (C), (B) and (A) without resetting the registering wheels.

I have explained a machine with 4 columns of keys, but a machine with more than four columns would be the same in principle, the only important difference being that the latch-guiding frame, instead of reciprocating 4 times, as in the machine described, would be arranged to reciprocate as many times for each forward movement of lever 7 as there are columns of keys on the keyboard.

While I have selected simple examples for purposes of illustration and to assist in pointing out the parts of the machine and their uses, it will be understood that the machine is adaptable to the working of problems much more extensive and complicated than those I have selected, but that the principle and mode of operation of the machine is unchanged.

For purpose of description I have confined myself to the mechanism shown in the drawings, but it will be understood that many modifications in details of construction and arrangement of parts may be made without departing from the spirit of my invention.

While I have for convenience in description, referred to parts 168 and 169 as "plates"—it is to be understood that I do not consider my invention to be limited to the particular construction shown, and that I mean, by referring to it in this specification and claims, as a "plate"—to include in that term the mechanical equivalents of this part.

Having described my invention, what I claim and desire to secure by Letters Patent, is:—

1. In a calculating machine, register wheels; a pair of movable plates operatively connected to each register wheel; said plates being arranged in pairs; nine groups of stops carried by each plate; each group comprising nine stops arranged transversely of said plate; a movable latch in proximity to each group of stops; means for moving said latch into operative relation with one of said groups of stops on each plate of a pair; means for moving said latch into alinement with any stop of said group; means for moving said latch when so alined with said stop through a fixed distance of travel; the distance from said latch, when at the beginning of its travel, to the stops of said pair of plates being pre-determined fractions of the travel of the latch, whereby said latch will move said stops and the plates of said pair predetermined distances to cause the register wheels connected to said plate, to register pre-determined numbers.

2. In a calculating machine, a register wheel; a movable plate operatively connected to said register wheel; nine groups of stops carried by said plate; each group comprising nine stops arranged transversely of said plate; nine movable latches; means for moving each of said latches into operative relation with one of said groups of stops; means for moving said latch into alinement with any stop of said group; means for moving said latch when so alined, with said stop through a fixed distance of travel; the distance from said latch, when at the beginning of its travel, to said stop being a pre-determined fraction of the travel of the latch, whereby said latch will move said stop and plate a pre-determined distance to cause said register wheel to register a pre-determined number.

3. In a calculating machine, a register wheel; a movable plate operatively connected to said register wheel; nine groups of stops on said plate; each group comprising nine stops; a latch adapted to engage one of the stops of each group; means for bringing said latch into engagement with said stop, and for moving said latch through a fixed distance of travel; the distance from said latch, when at the beginning of its travel, to said stop being a pre-determined fraction of the travel of the latch, whereby said latch will move said stop and plate a pre-determined distance to cause said register wheel to register a pre-determined number.

4. In a calculating machine, a product-selecting device comprising two movable members; one of said members being a movable plate; nine groups of stops on said plate; each group comprising nine stops; the other member being a latch adapted to contact with one of the stops of each group; means for bringing said latch and said stop into engagement; one of said members adapted to move through a pre-determined distance and to engage the other of said members and move it through a pre-determined fraction of said distance; a register device and means operatively connecting said register device and said last-mentioned member to cause said register device to indicate a numeral of said product.

5. In a multiplying machine, the combination of a keyboard, a plurality of depressible keys, riders adapted to be depressed by said keys, means for moving said riders laterally; movable latch-actuating contact-members located in the path of travel of said riders; a guiding frame adapted to move in two directions; the movement of said frame in one direction being through a constant distance; movable latches on said guiding frame; movable plates; a plurality of stops carried by said plates; said stops being located at a predetermined distance from the extremity of travel of said latch, whereby a movement through a predetermined distance is imparted to said plates; number wheels; and means connecting said plates and wheels whereby said plate in moving through said predetermined distance actuates one of said wheels to expose a predetermined number.

6. In a calculating machine, a product-selecting device comprising two movable members; nine groups of stops on one of said members; each group comprising nine stops; the other member being a latch adapted to contact with one of the stops of each group; means for bringing said latch and said stop into engagement; one of said members adapted to move through a pre-determined distance and to engage the other of said members and move it through a pre-determined fraction of said distance; and a registering device and means operatively connecting said registering device and said last-mentioned member to cause said registering device to indicate a numeral of said product.

7. In a machine of the class described, a latch actuating device comprising in combination, with a keyboard, a movable carriage, depressible riders on said carriage; means actuated by the digit keys of said keyboard for depressing such of said riders as are operatively connected to said digit keys; means for holding said riders depressed; depressible latches located in the path of travel of said riders, said latches being arranged in rows; said depressed riders adapted to engage a series of latches of each row and to depress and to release successively each latch of said series when the carriage is actuated.

8. In a multiplying machine, means for recording the product of two numbers composed of more than two digits each, said means comprising in combination, a keyboard, a register mechanism, and a product-selecting mechanism comprising a plurality of multiplicand riders adapted to be set by the keys of the key-board; a plurality of multiplier riders likewise set by the keys;

movable latches adapted to be depressed by said multiplicand riders, and to be positioned laterally by said multiplier riders; plates engaged by said latches and movable through variable lengths of travel; means for actuating said latches to move said plates, and means connecting said plates and said recording mechanism whereby the recording mechanism is caused to indicate the product of the multiplicand by the multiplier.

9. In a multiplying machine, means for effecting multiplication of continued products, comprising a register wheel; a selecting device consisting of nine stops connected to the register wheel, nine keys, means adapted to depress said keys, said stops and said depressing means being so positioned with relation to the numbers on the register wheel that when a given number is exposed on the register wheel, one of said stops and said depressing means are in operative position to depress the key that corresponds to said number, means adapted to actuate said stop to engage said key depressing means, to depress said key.

10. In a multiplying machine, means for effecting multiplication of continued products, comprising a register wheel, a selecting device consisting of nine stops connected to the register wheel, nine multiplicand setting devices, stops connected with said setting devices and positioned with relation to numbers on the register wheel so that when a given number is exposed on the wheel, only one of said stops is in operative position with relation to that multiplicand setting device which corresponds to said number; means for actuating said stop, and devices operatively positioned in the path of travel of said stop and connected to said setting device, and adapted to operate said setting device when said stop is actuated.

11. In a machine of the class described, a register wheel re-setting device comprising two register wheels; a mutilated gear fixed to the wheel of lower denomination, a second mutilated gear adapted to mesh with said first-mentioned gear; a revoluble shaft carrying said second gear, a cam fixed to said shaft, a ratchet wheel, a forward-carrying mechanism including a ratchet actuating arm, a pawl mounted on said arm and adapted to be engaged by said cam and to engage said ratchet wheel, said ratchet operatively connected to the register wheel of higher denomination, whereby when said second mutilated gear is rotated, the register wheel of lower denomination will be placed at its zero position and the pawl will be thrown out of engagement with said ratchet and with said register wheel of higher denomination, for the purposes set forth.

In testimony whereof, I affix my signature in presence of two witnesses.

FRANK L. MARTINDALE.

Witnesses:
CHRISTINE A. BRAIDEL,
NELLIE M. ANGUS.